United States Patent
Ozeki et al.

(10) Patent No.: US 8,728,675 B2
(45) Date of Patent: May 20, 2014

(54) FUEL CELL SYSTEM

(75) Inventors: Masataka Ozeki, Osaka (JP); Akinari Nakamura, Osaka (JP); Hideo Ohara, Osaka (JP); Yoshikazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/230,503

(22) Filed: Sep. 12, 2011

(65) Prior Publication Data

US 2012/0003554 A1 Jan. 5, 2012

Related U.S. Application Data

(63) Continuation of application No. 11/667,297, filed as application No. PCT/JP2005/020448 on Nov. 8, 2005, now abandoned.

(30) Foreign Application Priority Data

Nov. 8, 2004 (JP) .................................. 2004-323352

(51) Int. Cl.
    *H01M 8/06* (2006.01)
(52) U.S. Cl.
    CPC .................................. *H01M 8/0618* (2013.01)
    USPC ............ 429/429; 429/428; 429/443; 429/444
(58) Field of Classification Search
    CPC ................................................. H01M 8/0618
    USPC .................... 429/428, 429, 443, 444
    See application file for complete search history.

(56) References Cited

U.S. PATENT DOCUMENTS

| | | |
|---|---|---|
| 3,539,395 A | 11/1970 | Bartas |
| 4,657,828 A | 4/1987 | Tajima |
| 4,743,517 A | 5/1988 | Cohen et al. |
| 5,434,015 A | 7/1995 | Yamada et al. |

(Continued)

FOREIGN PATENT DOCUMENTS

| | | |
|---|---|---|
| CN | 1323450 A | 11/2001 |
| EP | 0 642 184 A2 | 3/1995 |

(Continued)

OTHER PUBLICATIONS

English translation of Japanese Office Action issued in Japanese Patent Application No. JP 2006-517870 mailed Feb. 9, 2010.

(Continued)

*Primary Examiner* — Ula C Ruddock
*Assistant Examiner* — Scott J Chmielecki
(74) *Attorney, Agent, or Firm* — McDermott Will & Emery LLP

(57) ABSTRACT

A fuel cell system is disclosed in which the oxidative degradation of an anode of a fuel cell during an operation stop period is restrained.
The fuel cell system (39) of the invention comprises a fuel cell (1) configured to generate electric power by use of hydrogen contained in a fuel gas supplied to an anode (1*a*) and oxygen contained in an oxidizing gas supplied to a cathode (1*c*); and a combustor (4) configured to combust flammable gas, and is formed such that after stopping the power generation, the flammable gas is introduced into and kept in the cathode (1*c*) and when discharging the flammable gas from the cathode (1*c*), the flammable gas is combusted by the combustor (4).

21 Claims, 5 Drawing Sheets

(56) References Cited

U.S. PATENT DOCUMENTS

| | | |
|---|---|---|
| 6,331,366 B1 | 12/2001 | Van Dine et al. |
| 6,521,204 B1 | 2/2003 | Borup et al. |
| 6,814,944 B1 | 11/2004 | Matsui et al. |
| 2001/0002248 A1 | 5/2001 | Ukai et al. |
| 2002/0122966 A1 | 9/2002 | Acker et al. |
| 2002/0142200 A1 | 10/2002 | Formanski et al. |
| 2003/0064274 A1 | 4/2003 | Blaszczyk et al. |
| 2003/0072990 A1* | 4/2003 | Sugawara et al. .............. 429/42 |
| 2003/0077488 A1 | 4/2003 | Yamamoto et al. |
| 2003/0194590 A1 | 10/2003 | Cargnelli et al. |
| 2003/0224226 A1 | 12/2003 | Jia et al. |
| 2004/0126628 A1 | 7/2004 | Balliet et al. |
| 2005/0031917 A1 | 2/2005 | Margiott et al. |
| 2005/0129990 A1 | 6/2005 | Ozeki et al. |
| 2007/0003805 A1* | 1/2007 | Sugawara et al. .............. 429/22 |
| 2009/0291339 A1 | 11/2009 | Ozeki et al. |

FOREIGN PATENT DOCUMENTS

| | | |
|---|---|---|
| EP | 1 291 948 A1 | 3/2003 |
| JP | 54-144936 | 11/1979 |
| JP | 62-190660 | 8/1987 |
| JP | 62-190660 A | 8/1987 |
| JP | 63-259971 A | 10/1988 |
| JP | 63-259972 A | 10/1988 |
| JP | 03-000400 | 1/1991 |
| JP | 5-307970 | 11/1993 |
| JP | 06-267573 | 9/1994 |
| JP | 9-298065 A | 11/1997 |
| JP | 9-306522 A | 11/1997 |
| JP | 2001-189165 A | 7/2001 |
| JP | 2002-93448 A | 3/2002 |
| JP | 2002-104807 A | 4/2002 |
| JP | 2002-124278 A | 4/2002 |
| JP | 2002-158019 A | 5/2002 |
| JP | 2003-282114 A | 10/2003 |
| JP | 2004-67407 A | 3/2004 |
| JP | 2004-172027 A | 6/2004 |
| JP | 2004-172049 A | 6/2004 |
| JP | 2005-71949 A | 3/2005 |
| JP | 2005-93115 A | 4/2005 |
| WO | WO 99/67830 | 12/1999 |
| WO | WO 00/39877 | 7/2000 |
| WO | WO 01/47801 A1 | 7/2001 |
| WO | WO 01/97312 A1 | 12/2001 |
| WO | WO-2004/004057 A1 | 1/2004 |

OTHER PUBLICATIONS

United States Office Action issued in U.S. Appl. No. 12/502,263 dated Sep. 9, 2009.

United States Office Action issued in U.S. Appl. No. 12/502,263 dated Mar. 1, 2010.

United States Office Action issued in U.S. Appl. No. 12/502,263 dated Feb. 24, 2012.

\* cited by examiner

FUEL CELL SYSTEM

RELATED APPLICATIONS

This application is a Continuation of U.S. application Ser. No. 11/667,297, filed on May 8, 2007 now abandoned, which is the U.S. National Phase under 35 U.S.C. §371 of International Application No. PCT/JP2005/020448, filed on Nov. 8, 2005, which in turn claims the benefit of Japanese Application No. 2004-323352, filed on Nov. 8, 2004, the disclosures of which Applications are incorporated by reference herein.

TECHNICAL FIELD

The present invention relates to a fuel cell system and more particularly to a technique for treating flammable gas that has been filled into the cathode of a fuel cell, after stopping power generation.

BACKGROUND ART

As a technique for stopping a fuel cell system, there has heretofore been proposed a method of purging flammable gas from the fuel gas passage of the fuel cell system by use of inert gas such as nitrogen. This purge method using inert gas, however, disadvantageously requires additional provision of a feeding system such as a nitrogen gas cylinder or Ar gas cylinder.

Various shutdown methods without use of inert purge gas have been proposed. A known method uses air for purging the fuel gas passage of a fuel cell system. This method will be outlined below.

As illustrated in FIG. 5, a fuel cell system 39 has, as chief components, a solid polymer electrolyte membrane type fuel cell 1 having an anode 1a and a cathode 1c; a fuel processor 2 having a reformer (not shown) for generating hydrogen-rich fuel gas by adding water to city gas or natural gas to reform it, which city gas or natural gas serves as a power generation material gas; a water feeder 3 for supplying water to the reformer of the fuel processor 2; a material gas feeder 6 for supplying the power generation material gas to the reformer of the fuel processor 2; a combustor 4 for combusting remaining fuel gas that has been discharged without being consumed in the anode 1a of the fuel cell 1; a blower 5 that serves as an oxidizing gas feeding device for supplying oxidizing gas (air) containing oxygen to the fuel cell 1 to discharge remaining gas outside from the fuel cell 1; and a purge air feeder 26 for supplying purge air for purge treatment of the inside of the fuel processor 2 when stopping the power generation of the fuel cell system 39.

In the fuel cell system 39, a reaction between the hydrogen-rich fuel gas supplied as the fuel gas to the anode 1a of the fuel cell 1 and air supplied as the oxygen-containing oxidizing gas to the cathode 1c of the fuel cell 1 is caused for power generation within the fuel cell 1, and at shutdown of the fuel cell system 39, the fuel gas passage is finally purged by air. A controller 21 properly controls the blower 5, the material gas feeder 6, the water feeder 3, the air feeder 26 and others to perform the above power generation and shutdown operation.

More concretely, when stopping the power generation of the fuel cell, hydrogen-containing fuel gas remaining within the fuel gas passage is removed by vapor which has been generated by supplying water from the water feeder 3 to the reformer of the fuel processor 2. Then, air from the purge air feeder 26 is allowed to flow into the fuel gas passage, thereby finally performing air purge (see Japanese Patent Document 1).

Compared to the conventional purge treatment process in which when stopping the power generation of the fuel cell system, nitrogen gas is allowed to flow into the fuel processor 2 and the fuel cell 1 so that remaining gas (fuel gas etc.) within these members 2, 1 is guided to the combustor 4 and undergoes treatment within the combustor 4, the above fuel cell system 39 can obviate the need for a storage for storing nitrogen gas so that it can attain cost reduction. The above technique has another advantage that air is supplied to the inside of the fuel cell after the removal of hydrogen gas from the fuel cell by use of vapor, thereby preventing the corrosion of the passages due to water droplets generated from vapor.

Apart from the above shutdown method, there is known another technique (see Patent Document 2) according to which when stopping power generation, air leakage into the anode of the fuel cell is prevented by introducing fuel gas (e.g., hydrogen-rich fuel gas) or power generation material gas (e.g., city gas or natural gas) into the anode and confining it therein, so that the durability of the fuel cell is maintained.

Patent Document 1: International Publication No. WO01/97312

Patent Document 2: Japanese Laid-Open Patent Application Publication No. 2003-282114

DISCLOSURE OF THE INVENTION

Problems that the Invention is to Solve

Meanwhile, an alloy catalyst comprised of platinum and ruthenium is usually used for the anode of a solid polymer electrolyte fuel cell and if the anode is exposed to air like the case of the fuel cell system disclosed in Patent Document 1, the deterioration of catalytic performance (oxidative degradation) owing to oxidizing atmosphere may occur. Therefore, it is undesirable in view of the service life of the fuel cell system to keep the anode being filled with air when stopping the power generation of the fuel cell system.

Although the fuel cell system shutdown method disclosed in Patent Document 2 seems to prevent the oxidative degradation of the anode, there still remains a possibility that if air (oxygen gas) remains in the cathode after a stop of the power generation of the fuel cell system, the air (oxygen gas) will move to the anode, passing through the porous solid polymer electrolyte membrane with the result that the anode is degraded by oxidation.

The present invention is directed to overcoming the above problems and a primary object of the invention is therefore to provide a fuel cell system capable of restraining the oxidative degradation of the anode of the fuel cell during an operation stop period.

Another object of the invention is to provide a fuel cell system capable of performing proper exhaust gas treatment (e.g., flammable gas combustion treatment) when discharging flammable gas from the cathode of the fuel cell.

Means of Solving the Problems

In accomplishing above objects, there has been provided, in accordance with a first aspect of the present invention, a fuel cell system comprising: a fuel cell configured to generate electric power by use of hydrogen contained in a fuel gas supplied to an anode and oxygen contained in an oxidizing gas supplied to a cathode; and a combustor configured to combust flammable gas, wherein after stopping the power generation, a flammable gas is introduced into and kept in the cathode and when discharging the flammable gas from the cathode, the flammable gas is combusted by the combustor.

According to a second aspect of the invention, there is provided a fuel cell system comprising: combustion gas feeding device configured to supply a combustion gas to the combustor; and a combustion air feeder configured to supply a combustion air to the combustor;

wherein the combustion air feeder supplies the combustion air in such an amount that an air-fuel ratio within the combustor becomes 1 or more, with respect to flammable gas comprised of at least one of the flammable gas supplied to the combustor and the combustion gas.

According to a third aspect of the invention, there is provided a fuel cell system, wherein the gas discharged from the cathode of the fuel cell is supplied to a passage through which the combustion gas is supplied to the combustor.

According to a fourth aspect of the invention, there is provided a fuel cell system, wherein the gas discharged from the cathode of the fuel cell is supplied to a passage through which the combustion air is supplied to the combustor.

According to a fifth aspect of the invention, there is provided a fuel cell system, wherein, at least during the period of an operation in which the oxidizing gas in the cathode of the fuel cell is replaced with the flammable gas or the flammable gas in the cathode is replaced with the oxidizing gas, the amount of gas supplied to the cathode or the supply amount of the combustion gas is controlled such that the ratio of the flow rate of the flammable gas contained in the combustion gas to the sum of the flow rate of oxygen contained in the gas discharged from the cathode and the flow rate of the flammable gas is below the lower combustible limit of the flammable gas or exceeds the upper combustible limit of the flammable gas based on a mixture of the flammable gas and oxygen.

According to a sixth aspect of the invention, there is provided a fuel cell system, wherein, in cases where air is used as the oxidizing gas, at least during the period of an operation in which air in the cathode of the fuel cell is replaced with the flammable gas or the flammable gas in the cathode is replaced with air, the amount of gas supplied to the cathode or the supply amount of the combustion gas is controlled such that the ratio of the flow rate of the flammable gas contained in the combustion gas to the sum of the flow rate of air discharged from the cathode and the flow rate of the flammable gas is below the lower combustible limit of the flammable gas or exceeds the upper combustible limit of the flammable gas based on a mixture of the flammable gas and air.

According to a seventh aspect of the invention, there is provided a fuel cell system, wherein the flammable gas is hydrogen gas.

According to an eighth aspect of the invention, there is provided a fuel cell system, wherein, at least during the period of an operation in which the oxidizing gas in the cathode of the fuel cell is replaced with the flammable gas or the flammable gas in the cathode is replaced with the oxidizing gas, the amount of gas supplied to the cathode or the supply amount of the combustion gas is controlled such that the ratio of the flow rate of the combustion gas to the sum of the flow rate of oxygen contained in the gas discharged from the cathode and the flow rate of the combustion gas is below the lower combustible limit of the combustion gas or exceeds the upper combustible limit of the combustion gas based on a mixture of the combustion gas and oxygen.

According to a ninth aspect of the invention, there is provided a fuel cell system, wherein, in cases where air is used as the oxidizing gas, at least during the period of an operation in which the air in the cathode of the fuel cell is replaced with the flammable gas or the flammable gas in the cathode is replaced with air, the amount of gas supplied to the cathode or the supply amount of the combustion gas is controlled such that the ratio of the flow rate of the combustion gas to the sum of the flow rate of the air discharged from the cathode and the flow rate of the combustion gas is below the lower combustible limit of the combustion gas or exceeds the upper combustible limit of the combustion gas based on a mixture of the combustion gas and air.

According to a tenth aspect of the invention, there is provided a fuel cell system, wherein, at least during the period of an operation in which the oxidizing gas in the cathode of the fuel cell is replaced with the flammable gas or the flammable gas in the cathode is replaced with the oxidizing gas, the amount of gas supplied to the cathode or the supply amount of the combustion air is controlled such that the ratio of the flow rate of the flammable gas discharged from the cathode to the sum of the flow rate of the flammable gas and the flow rate of the combustion air is below the lower combustible limit of flammable gas or exceeds the upper combustible limit of the flammable gas based on a mixture of flammable gas and air.

According to an eleventh aspect of the invention, there is provided a fuel cell system, wherein, at least during the period of an operation in which the oxidizing gas in the cathode of the fuel cell is replaced with the flammable gas or the flammable gas in the cathode is replaced with the oxidizing gas, the amount of gas supplied to the cathode or the supply amount of the combustion air is controlled such that the ratio of the flow rate of the gas discharged from the cathode to the sum of the flow rate of the gas and the flow rate of the combustion air is below the lower combustible limit of the gas discharged from the cathode or exceeds the upper combustible limit of the gas based on a mixture of the gas and air.

According to a twelfth aspect of the invention, there is provided a fuel cell system, wherein at a start of the power generation, the oxidizing gas is supplied to the cathode, thereby discharging the flammable gas.

According to a thirteenth aspect of the invention, there is provided a fuel cell system comprising a fuel processor having a reformer for generating the fuel gas containing hydrogen from a power generation material, wherein the combustor is a fuel processing burner for heating the reformer.

According to a fourteenth aspect of the invention, there is provided a fuel cell system comprising a hydrogen feeder capable of supplying hydrogen gas as the fuel gas for the fuel cell.

According to a fifteenth aspect of the invention, there is provided a fuel cell system, wherein the combustion gas is the fuel gas discharged from the fuel processor or remaining fuel gas discharged from the fuel cell.

According to a sixteenth aspect of the invention, there is provided a fuel cell system, wherein the combustion gas is the hydrogen gas supplied from the hydrogen feeder or remaining hydrogen gas discharged from the fuel cell.

According to a seventeenth aspect of the invention, there is provided a fuel cell system, wherein during the period of the operation in which the oxidizing gas in the cathode of the fuel cell is replaced with the flammable gas or the flammable gas in the cathode is replaced with the oxidizing gas, the combustion air feeder supplies air in such an amount that an air-fuel ratio within said combustor as a fuel processing burner becomes 1 or more, with respect to flammable gas and the combustion gas in the fuel processing burner.

According to an eighteenth aspect of the invention, there is provided a fuel cell system, wherein before the operation in which the oxidizing gas in the cathode of the fuel cell is replaced with the flammable gas or the flammable gas in the cathode is replaced with the oxidizing gas, the temperature of the reformer is controlled so as to be lower than a specified target temperature for normal operation.

These objects as well as other objects, features and advantages of the invention will become apparent to those skilled in the art from the following detailed description of preferred embodiments with reference to the accompanying drawings.

Effects of the Invention

According to the invention, operation is stopped by filling the cathode of the fuel cell with flammable gas such as city gas, whereby the oxidative degradation of the anode owing to air in the cathode of the fuel cell in an operation stop period can be prevented and proper exhaust gas treatment (e.g., flammable gas combustion treatment) can be performed when discharging the flammable gas from the cathode of the fuel cell.

DESCRIPTION OF REFERENCE NUMERALS

Figure 1:
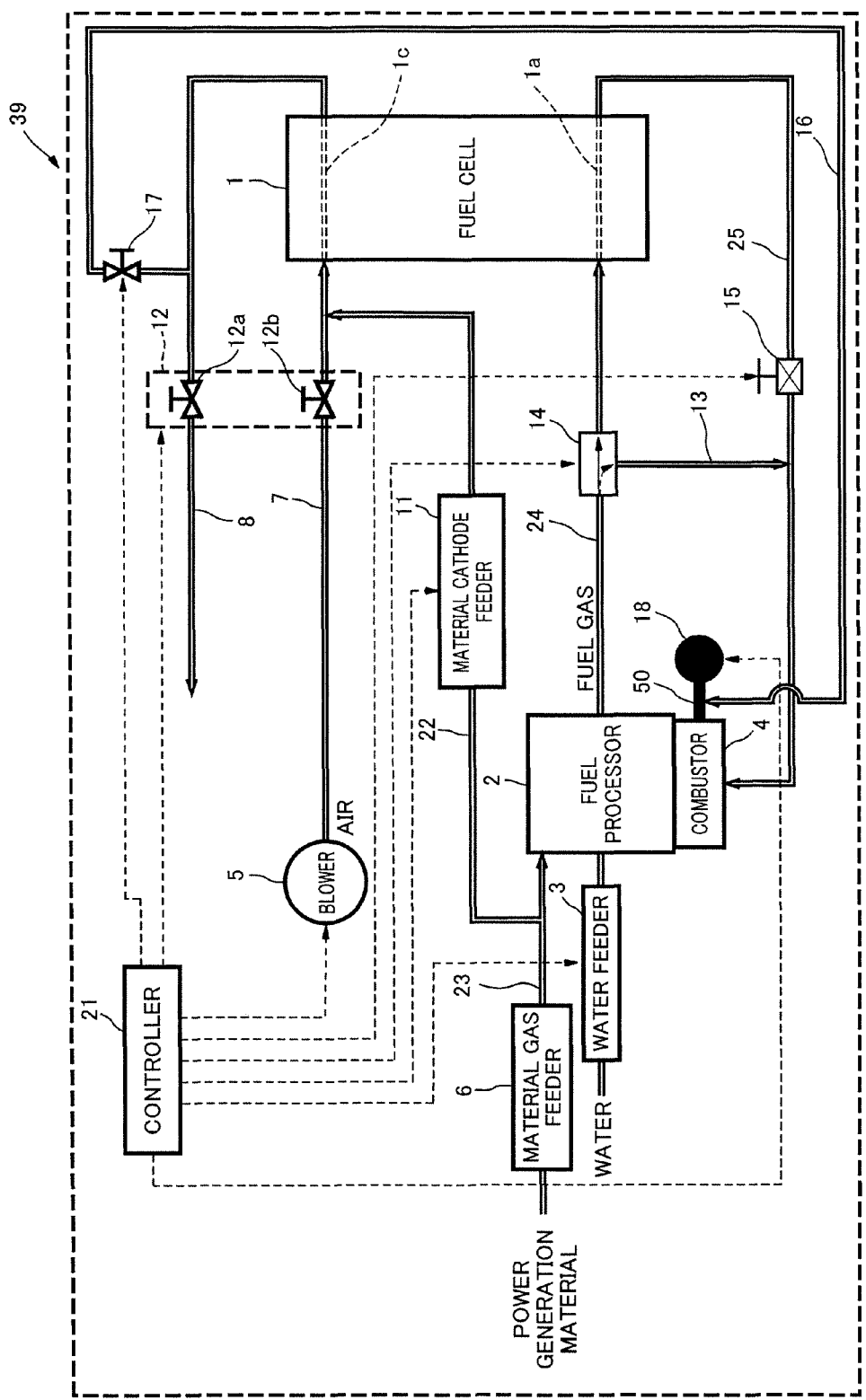
FIG. 1 is a block diagram illustrating a rough outline of the structure of a fuel cell system according to a first embodiment.

1: fuel cell
2: fuel processor
3: water feeder
4: combustor
5: blower
6: material gas feeder
7: cathode feed pipe
8: cathode exhaust pipe
9: cathode bypass pipe
11: material cathode feeder
12: cathode shut-up device
12a: first outlet-side opening/closing valve
12b: second inlet-side opening/closing valve
13: anode bypass pipe
14: flow path switching device
15: back flow pipe valve
16: first cathode combustion pipe
17: first combustion pipe opening/closing valve
18: combustion fan
19: second cathode combustion pipe
20: second combustion pipe opening/closing valve
21: controller
22: material cathode feed pipe
23: material feed pipe
24: anode feed pipe
25: fuel gas back flow pipe
26: purge air feeder
39: fuel cell system

BEST MODE FOR CARRYING OUT THE INVENTION

Referring now to the accompanying drawings, preferred embodiments of the invention will be described below.

First Embodiment

FIG. 1 is a block diagram illustrating a rough outline of the structure of a fuel cell system according to a first embodiment.

A fuel cell system 39 comprises, as chief components, a material gas feeder 6 for supplying a power generation material gas to a reformer (not shown) provided in a fuel processor 2 through a material feed pipe 23, the power generation material gas containing at least a flammable organic compound comprised of carbon and hydrogen (e.g., city gas and natural gas); a solid polymer electrolyte fuel cell 1 for generating electric power by use of a hydrogen-containing fuel gas and an oxygen-containing oxidizing gas (air); a fuel processor 2 having the reformer for generating a hydrogen-rich fuel gas by reforming the power generation material gas through water addition; a water feeder 3 for supplying water to the reformer of the fuel processor 2; a combustor 4 serving as a fuel processing burner for burning remaining fuel gas to heat the reformer of the fuel processor 2 which remaining fuel gas has been sent from an anode 1a of the fuel cell 1 without being consumed therein; a combustion fan 18 serving as the combustion air feeding device (air feeder) of the invention for supplying combustion air to the combustor 4 through a combustion air feed passage 50; and a blower 5 that serves as an oxidizing gas feeder for supplying an oxidizing gas to a cathode 1c of the fuel cell 1 and purging remaining oxidizing gas from the cathode 1c.

The gas pipe system of the fuel cell system 39 includes: a cathode feed pipe 7 that serves as an oxidizing gas flow path for guiding air from the blower 5 to the cathode 1c of the fuel cell 1; a cathode exhaust pipe 8 that serves as an oxidizing gas flow path for discharging remaining air from the cathode 1c of the fuel cell 1 to the atmosphere; a cathode shut-up device 12 constituted by a first outlet-side opening/closing valve 12a (first oxidizing gas flow path valve) for opening and closing the outlet of the cathode 1c of the fuel cell 1 and a second inlet-side opening/closing valve 12b (second oxidizing gas flow path valve) for opening and closing the inlet of the cathode 1c of the fuel cell 1; a material feed pipe 23 for guiding the power generation material gas from the material gas feeder 6 to the fuel processor 2; an anode feed pipe 24 for guiding the fuel gas sent from the fuel processor 2 to the anode 1a of the fuel cell 1 through a flow path switching device 14; a fuel gas back flow pipe 25 that serves as the combustion gas feeding means of the invention for supplying the combustor 4 with the fuel gas discharged from the fuel processor 2 or the remaining fuel gas discharged from the anode 1a of the fuel cell 1 (these fuel gases are the combustion gas of the invention); a back flow pipe valve 15 disposed in the fuel gas back flow pipe 25, for opening and closing the fuel gas back flow pipe 25; an anode bypass pipe 13 for guiding the fuel gas sent from the fuel processor 2 to the fuel gas back flow pipe 25 on the downstream side of the back flow pipe valve 15 by means of the flow path switching device 14; a material cathode feed pipe 22 for connecting the material feed pipe 23 to the cathode feed pipe 7 on the downstream side of the second inlet-side opening/closing valve 12b; and a material cathode feeder 11 (flammable gas feeding device) disposed in a material cathode feed pipe 22, for guiding the power generation material gas to the cathode 1c.

Further, there are provided a first cathode combustion pipe 16 for connecting the outlet of the cathode 1c on the upstream side of the first outlet-side opening/closing valve 12a to the combustion air feed passage 50; and a first combustion pipe opening/closing valve 17 for switching the first cathode combustion pipe 16 between open and closed states. With such an arrangement, the oxidizing gas flowing in the cathode line (i.e., the first cathode combustion pipe 16) can be introduced into the combustor 4 without coming into contact with the fuel gas flowing in the anode line (i.e., the fuel gas back flow pipe 25), so that a mixture of the fuel gas and oxidizing gas is not produced in the flammable gas passage that extends to the combustor 4. This is desirable in the light of the control of the combustion properties of the combustor 4.

Herein, the flow path switching device 14 is configured with of, for example, a three-way valve and the material cathode feeder 11 is configured with, for example, a flow rate regulating valve or pump.

A controller 21 controls the blower 5, the material gas feeder 6, the water feeder 3, the material cathode feeder 11, the combustion fan 18 and the valves 12a, 12b, 14, 15, 17 to control the operation of the gas feeding system of the fuel cell system 39. In the drawings, the objects that the controller controls are indicated by dashed line. Although not shown in the drawings, the controller 21 receives detection signals from various sensors (such as temperature sensors and flow meters) and properly controls the operation of the fuel cell system 39 based on these detection signals.

Reference is made to FIG. 1 for hereinafter describing the operations of the fuel cell system 39 during the power generation period of the fuel cell system 39. Specifically, the operation for stopping the power generation and the operation for starting the power generation (start-up of the system 39) will be separately described.

During the power generation period of the fuel cell system 39, while the temperature of the reformer of the fuel processor 2 being kept at about 700° C., the hydrogen-rich fuel gas is generated by causing, under control of the controller 21, a reforming reaction between the power generation material gas supplied from the material gas feeder 6 and water supplied from the water feeder 3 within the reformer of the fuel processor 2. Then, the fuel gas sent from the fuel processor 2 is sent to the anode 1a of the fuel cell 1 after passing through the flow path switching device 14 disposed in the anode feed pipe 24 (the flow path switching device 14 is controlled by the controller 21 such that the anode feed pipe 24 is communicated with the anode 1a). The air supplied from the blower 5 passes through the second inlet-side opening/closing valve 12b in its open state by way of the cathode feed pipe 7 and is then sent to the cathode 1c of the fuel cell 1. In this way, hydrogen contained in the fuel gas and oxygen contained in the air are consumed thereby to generate electric power within the fuel cell 1.

The fuel gas, which has remained without being consumed in the power generation of the fuel cell 1, is sent to the combustor 4 after passing through the back flow pipe valve 15 in its open state by way of the fuel gas back flow pipe 25 and then burnt within the combustor 4 to be utilized as a heat source for heating the reformer of the fuel processor 2. The air, which has remained without being consumed by the power generation of the fuel cell 1, passes through the first outlet-side opening/closing valve 12a in its open state by way of the cathode exhaust pipe 8 and is then discharged to the atmosphere.

When stopping the power generation of the fuel cell system 39, the controller 21 stops the operation of the blower 5, thereby stopping the supply of air from the blower 5 to the cathode 1c, while closing the second inlet-side opening/closing valve 12b as well as the first outlet-side opening/closing valve 12a and opening the first combustion pipe opening/closing valve 17.

The controller 21 controls the flow path switching device 14 so as to form a bypass flow path (a passage by which the anode feed pipe 24 is communicated with the anode bypass pipe 13) and closes the valve 15. Thus, the fuel gas (hydrogen-rich gas) staying in the anode 1a of the fuel cell 1 can be sealed within the anode 1a and in this condition; the supply of the fuel gas from the fuel processor 2 to the anode 1a is stopped.

At this point, the material gas feeder 6 continues the supply of the power generation material gas to continue the combustion in the combustor 4, while the controller 21 operates the material cathode feeder 11 to guide the power generation material gas (flammable gas) to the cathode feed pipe 7 located on the downstream side of the second inlet-side opening/closing valve 12b through the material cathode feed pipe 22 and then, the power generation material gas is supplied to the cathode 1c of the fuel cell 1 through the cathode feed pipe 7. The amount of power generation material gas supplied to the cathode 1c of the fuel cell 1 by the material cathode feeder 11 is set by the controller 21 to a value that is about two or three times the inner volume of the cathode 1c, so that the air within the cathode 1c can be thoroughly replaced with the power generation material gas, that is, a flammable gas. At that time, the power generation material gas exceeding the inner volume of the cathode 1c is supplied to the combustion air feed passage 50 by way of the first cathode combustion pipe 16, so that the power generation material gas is mixed with the combustion air and the mixture is then introduced into and burnt in the combustor 4.

Herein, the pressure of the power generation material gas within an area of the material feed pipe 23 which area is close to the outlet of the material gas feeder 6 is raised by about 2 kPa. Therefore, the power generation material gas can be allowed to flow into the cathode 1c from the cathode feed pipe 7 located on the downstream side of the second inlet-side opening/closing valve 12b with the use of the inner pressure of the power generation material gas, by opening the flow rate regulating valve, which serves as the material cathode feeder 11 and is disposed in the material cathode feed pipe 22, in a condition where one end of the material cathode feed pipe 22 is connected to the area of the material feed pipe 23 close to the outlet of material gas feeder 6 whereas the other end is connected to the cathode feed pipe 7 located on the downstream side of the second inlet-side opening/closing valve 12b. If the supply pressure used for supplying the power generation material gas is insufficient, a feed pump may be used as the material cathode feeder 11 to forcibly send the power generation material gas into the cathode 1c by pumping.

The flow rate of the combustion air supplied by the combustion fan 18 and the flow rate of the power generation material gas supplied by the material cathode feeder 11 are set by the controller 21 such that the concentration of the flammable gas contained in the mixture of the combustion air and the power generation material gas is out of the combustible range and more preferably lower than the lower combustible limit, so that a back fire does not occur in the combustion air feed passage 50.

For example, the controller 21 may control the amount of power generation material gas to be supplied to the cathode 1c or the amount of combustion air supplied from the combustion fan 18, such that, in a power generation stop period of the fuel cell system 39 during which the air existing in the cathode 1c of the fuel cell 1 is replaced with the power generation material gas, the ratio of the flow rate of the power generation material gas discharged from the cathode 1c to the sum of the flow rate of the power generation material gas and the flow rate of the combustion air is out of the combustible range of the power generation material gas and, more preferably, lower than its lower combustible limit based on a mixture of the power generation material gas and air.

The above control is performed based on such a concept that the combustion of the flammable gas can be more easily controlled by adjusting the flow rate of the power generation material gas to a value lower than the lower combustible limit to make the flammable gas concentration of the mixed gas be out of the combustible range when feeding the power generation material gas to the combustion air feed passage 50 filled with air. The reason for this is that if the flow rate of the power generation material gas is adjusted to a value exceeding the upper combustible limit, the flammable gas concentration of the mixed gas in the combustion air feed passage 50 will temporarily fall in the combustible range before it becomes greater than the upper combustible limit.

Suppose that city gas 13A used in large cities is employed as the power generation material gas. Since the city gas 13A has a combustible range of about 5 to 15% when mixed with air, the flow rate of the power generation material gas supplied from the material gas cathode feeder 11 is adjusted by the controller 21 to a value less than one twentieth of the flow rate of the combustion air supplied from the combustion fan 18.

The above flow rate of the power generation material gas may be derived from the flow rate of the power generation material gas contained in the gas discharged from the cathode 1c. For more reliable safety, it may be equal to the flow rate of cathode off gas discharged from the cathode 1c on assumption that all of the gas discharged from the cathode 1c is the power generation material gas.

The amount of air sent to the combustor 4 by the combustion fan 18 should be such an amount that at least the mixture of the power generation material gas discharged from the first cathode combustion pipe 16 and the fuel gas sent from the fuel gas back flow pipe 25 can be perfectly combusted. In other words, it is necessary to send air to the mixture of the power generation material gas discharged from the first cathode combustion pipe 16 and the fuel gas sent from the fuel gas back flow pipe 25 in an amount that makes the air-fuel ratio within the combustor 4 be 1 or more. Accordingly, the combustion fan 18 is controlled by the controller 21 so as to send air to the combustor 4 in an amount that at least enables perfect combustion of the mixture of the power generation material gas and the fuel gas which is sent to the combustor 4 (an amount that makes the air-fuel ratio within the combustor 4 be 1 or more). It should be noted that the air-fuel ratio is the ratio ($A/A_0$) of the actual supply amount of air A to the theoretical amount of air (the minimum amount of air necessary for perfect fuel combustion) $A_0$ and that if the air-fuel ratio is less than 1, imperfect fuel combustion is likely to occur.

In the above discussion, the amount of power generation material gas supplied to the combustion air feed passage 50 through the first cathode combustion pipe 16 is adjusted to a value less than one twentieth of the flow rate of the combustion air supplied by the combustion fan 18 by controlling the opening of the flow rate regulating valve of the material cathode feeder 11. Instead, it may be adjusted to a value less than one twentieth of the flow rate of the combustion air, by controlling the output of the combustion fan 18.

In the latter case, the combustion fan 18 is controlled by the controller 21 so as to send air to the combustor 4 in such an amount that the mixture of the power generation material gas and the fuel gas sent to the combustor 4 is perfectly combusted and the power generation material gas concentration of the mixture of combustion air and the power generation material gas within the combustion air feed passage 50 becomes less than the lower combustible limit.

In the above-described power generation stop operation, during the replacement of the air within the cathode 1c of the fuel cell 1 with the power generation material gas, the power generation material gas is supplied to the combustor 4 in addition to the fuel gas supplied to the combustor 4 in the normal operation, so that the calorie of combustion heat increases. As a result, the temperature of the fuel processor 2 and more particularly the reformer increases so that it may become higher than the upper limit (e.g., 750° C.) of the temperature range that ensures the heat resistance of the reforming catalyst. Therefore, it is desirable to control the output of the combustion fan 18 by the controller 21 such that air is sent to the combustor 4 in an amount more than the amount of air required for perfect combustion of the mixture of the power generation material gas and fuel gas sent to the combustor 4 or in an amount more than the amount of air necessary for making the power generation material gas concentration of the mixture of combustion air and the power generation material gas within the combustion air feed passage 50 lower than the lower combustible limit. For instance, the supply amount of air, which makes the air-fuel ratio within the combustor 4 exceed 1, is desirable. With this arrangement, the increase in the temperature of the reformer can be restrained by the air cooling effect of the combustion air supplied from the combustion fan 18. It should be noted that a large amount of air such as described above may be supplied in a continuous manner in the course of the replacement of the air within the cathode 1c of the fuel cell 1 with the power generation material gas. Alternatively, air may be supplied by increasing the output of the combustion fan 18 according to rises in the temperature of the reformer so that the increase of the temperature of the reformer is restrained.

It is desirable in the light of energy efficiency that the controller 21 perform control instead of the above operation during the power generation stop period such that: prior to the replacement of the air within the cathode 1c of the fuel cell 1 with the power generation material gas, the flow rate of the power generation material gas from the material gas feeder 6 drops to a value lower than the flow rate for the normal operation in order to lower the temperature of the reformer to a value (e.g., 620° C.) below a specified target temperature (e.g., 650° C.) for the normal operation, and during the replacement of the air within the cathode 1c with the power generation material gas, the temperature of the reformer does not exceed the upper limit (e.g., 750° C.) of the temperature range that ensures the heat resistance of the reforming catalyst.

At the time when the amount of power generation material gas supplied to the cathode 1c of the fuel cell 1 by the material cathode feeder 11 has reached a value that is about two or three times the inner volume of the cathode 1c, the controller 21 controls the material gas feeder 6 and the material cathode feeder 11 so as to stop the supply of the power generation material gas, and closes the first combustion pipe opening/closing valve 17, stopping the combustion fan 18.

After stopping the power generation through the above procedure, the anode 1a can be filled with the hydrogen-rich fuel gas, while the cathode 1c can be filled with the power generation material gas, which is a flammable gas, so that the oxidative degradation of the anode 1a can be prevented.

When starting the power generation of the fuel cell system 39 (a start-up of the system 39), the power generation material gas is supplied from the material gas feeder 6 to the fuel processor 2 through the material feed pipe 23 in a condition where a bypass flow path has been formed by controlling the flow path switching device 14 with the controller 21. The gas, which has passed through the fuel processor 2, is sent to the flow path switching device 14 and then to the combustor 4 by way of the anode bypass pipe 13 and the fuel gas back flow pipe 25. In the combustor 4, the gas is combusted. Meanwhile, the controller 21 controls the water feeder 3 to supply water to the fuel processor 2. Then, the temperature of the reformer of the fuel processor 2 is raised to about 700° C. by utilizing the combustion heat of the combustor 4, and the reformer is kept in a temperature condition where the hydrogen-rich fuel gas can be generated from the power generation material gas and vapor.

At the time when the temperature of a carbon monoxide removing section (not shown) of the fuel processor 2 is allowed to reach a reaction stabilization temperature, thereby reducing the carbon monoxide concentration of the fuel gas to such a degree (about 20 ppm) that the anode electrode of the fuel cell 1 does not degrade, the controller 21 opens the back flow pipe valve 15 disposed in the fuel gas back flow pipe 25 and switches the flow path switching device 14 from the side of the anode bypass pipe 13, thereby forming the feed flow path for the anode 1a. In this condition (in which the anode feed pipe 24 is communicated with the anode 1a), the fuel gas, which has been sent from the fuel processor 2, is guided to the anode 1a of the fuel cell 1 through the flow path switching device 14, and the remaining fuel gas which has not been consumed in the anode 1a is allowed to flow back to the combustor 4 through the fuel gas back flow pipe 25 and the back flow pipe valve 15 to combust the remaining fuel gas within the combustor 4, so that a supply of gas to the anode 1a of the fuel cell 1 is resumed to enable power generation.

At the same time, the second inlet-side opening/closing valve 12b of the cathode shut-up device 12 and the first combustion pipe opening/closing valve 17 are opened by the controller 21 to start air blasting by the blower 5.

At that time, the flow rate of air supplied to the cathode 1c of the fuel cell 1 by the blower 5 becomes equal to the flow rate of the power generation material gas forced out from the first cathode combustion pipe 16 toward the combustor 4 by the air supplied to the cathode 1c. Therefore, the flow rate of air, which is supplied by the blower 5 such that the flammable gas concentration of the mixed gas within the combustion air feed passage 50 becomes lower than the lower combustible limit similarly to the case discussed earlier, is adjusted by the controller 21 to a value less than one twentieth of the flow rate of combustion air supplied by the combustion fan 18.

For example, the controller 21 may control the amount of air to be supplied to the cathode 1c or the amount of combustion air supplied from the combustion fan 18, such that, in the power generation stop period of the fuel cell system 39 during which the power generation material gas existing in the cathode 1c of the fuel cell 1 is replaced with air, the ratio of the flow rate of the power generation material gas discharged from the cathode 1c to the sum of the flow rate of the power generation material gas and the flow rate of the combustion air is out of the combustible range of the power generation material gas and, more preferably, lower than its lower combustible limit based on a mixture of the power generation material gas and air.

In the above discussion, the amount of power generation material gas supplied to the combustion air feed passage 50 through the first cathode combustion pipe 16 is adjusted to a value less than one twentieth of the flow rate of the combustion air supplied by the combustion fan 18 by controlling the opening of the flow rate regulating valve of the material cathode feeder 11. Instead, it may be adjusted to a value less than one twentieth of the flow rate of the combustion air by controlling the output of the combustion fan 18.

At that time, the combustion fan 18 is controlled by the controller 21 so as to send air to the combustor 4 in such an amount that the mixture of the power generation material gas and the fuel gas sent to the combustor 4 is perfectly combusted and the power generation material gas concentration of the mixture of combustion air and the power generation material gas within the combustion air feed passage 50 becomes less than the lower combustible limit.

The above flow rate of the power generation material gas may be derived from the flow rate of the power generation material gas contained in the gas discharged from the cathode 1c. For more reliable safety, it may be equal to the flow rate of cathode off gas discharged from the cathode 1c on assumption that all of the gas discharged from the cathode 1c is the power generation material gas.

The amount of air sent to the combustor 4 should be such an amount that at least the mixture of the power generation material gas discharged from the first cathode combustion pipe 16 and the fuel gas sent from the fuel gas back flow pipe 25 can be perfectly combusted (i.e., the air amount with which the air-fuel ratio within the combustor 4 is 1 or more). Specifically, the combustion fan 18 is controlled by the controller 21 so as to send air to the combustor 4 in such an amount that at least perfect combustion of the power generation material gas and fuel gas sent to the combustor 4 becomes possible.

In the above-described power generation stop operation, during the replacement of the power generation material gas within the cathode 1c of the fuel cell 1 with air, the power generation material gas is supplied to the combustor 4 in addition to the fuel gas supplied to the combustor 4 in the normal operation, so that the calorie of combustion heat increases. As a result, the temperature of the fuel processor 2 and more particularly the reformer is likely to increase so that it may become higher than the upper limit (e.g., 750° C.) of the temperature range that ensures the heat resistance of the reforming catalyst. Therefore, it is desirable to control the output of the combustion fan 18 by the controller 21 such that air is sent to the combustor 4 in an amount more than the amount of air required for perfect combustion of the mixture of the power generation material gas and fuel gas sent to the combustor 4 or in an amount more than the amount of air necessary for making the power generation material gas concentration of the mixture of combustion air and the power generation material gas within the combustion air feed passage 50 lower than the lower combustible limit. For instance, the supply amount of air, which makes the air-fuel ratio within the combustor 4 exceed 1, is desirable. With this arrangement, the increase in the temperature of the reformer can be restrained by the air cooling effect of the combustion air supplied from the combustion fan 18. It should be noted that a large amount of air such as described above may be supplied in a continuous manner in the course of the replacement of the power generation material gas within the cathode 1c of the fuel cell 1 with air. Alternatively, air may be supplied by increasing the output of the combustion fan 18 according to rises in the temperature of the reformer, so that the increase of the temperature of the reformer is restrained.

It is desirable in the light of energy efficiency that the controller 21 perform control instead of the above operation during the power generation start period such that: prior to the replacement of the air within the cathode 1c of the fuel cell 1 with the power generation material gas, the flow rate of the power generation material gas from the material gas feeder 6 drops to a value lower than the flow rate for the normal operation in order to lower the temperature of the reformer to a value (e.g., 620° C.) below a specified target temperature (e.g., 650° C.) for the normal operation, and during the replacement of the power generation material gas within the cathode 1c with air, the temperature of the reformer does not exceed the upper limit (e.g., 750° C.) of the temperature range that ensures the heat resistance of the reforming catalyst. After completion of the replacement of the power generation material gas in the cathode 1c with air, the flow rate of the power generation material gas is increased to the value of the flow rate for the normal operation.

After the replacement of the power generation material gas in the cathode 1c of the fuel cell 1 with air, the controller 21 opens the first outlet-side opening/closing valve 12a of the cathode shut-up device 12 and closes the first combustion pipe opening/closing valve 17, whereby the amount of air supplied by the blower 5 is set to a value required for the power generation of the fuel cell 1, and then, the power generation of the fuel cell 1 starts.

Thus, the power generation material gas discharged from the cathode 1c of the fuel cell 1 at a start or stop of the power generation in the fuel cell system 39 is sent from the first cathode combustion pipe 16 to the combustion air feed passage 50 to be mixed with combustion air and this mixed gas is sent to the combustor 4. Thereby, the power generation material gas discharged from the cathode 1c can be completely combusted and discharged from the fuel cell system 39.

In addition, the flow rate of power generation material gas sent from the first cathode combustion pipe 16 to the combustion air feed passage 50 is adjusted by the controller 21 to a value less than one twentieth of the flow rate of combustion air supplied from the combustion fan 18, whereby it becomes possible to perform proper operation free from the risk of a back fire that occurs from the combustor 4 toward the combustion air feed passage 50.

Further, since the condition where the cathode 1c of the fuel cell 1 is filled with the power generation material gas can be maintained during the power generation stop period of the fuel cell system 39, not only the flammable gas (fuel gas) can be sealed in the anode 1a but also the cause of the oxidation of the catalyst of the anode 1a of the fuel cell 1 can be thoroughly eliminated, so that the durability of the anode 1a of the fuel cell system 39 can be prevented from decreasing.

Second Embodiment

Figure 2:
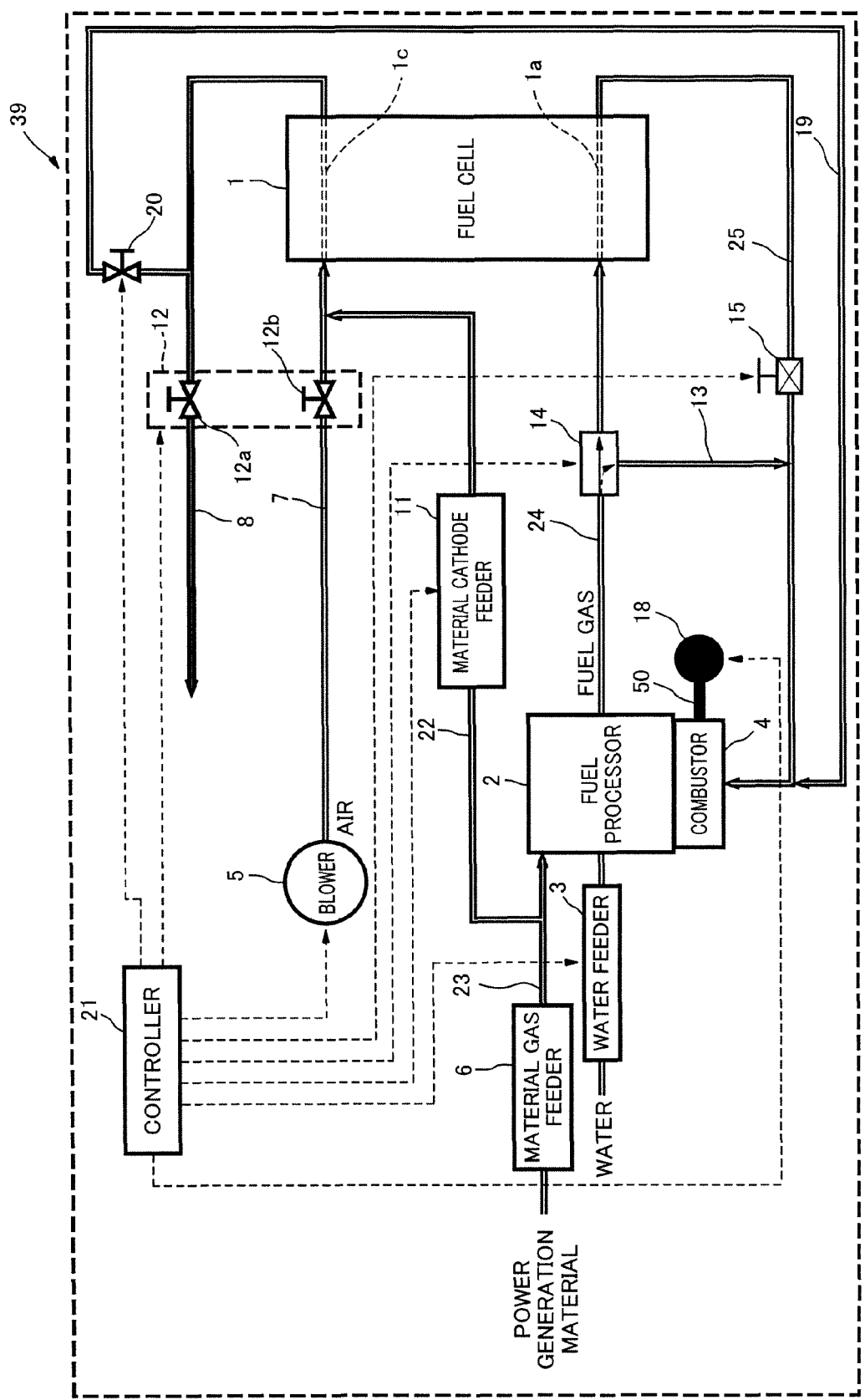
FIG. 2 is a block diagram illustrating a rough outline of the structure of a fuel cell system according to a second embodiment.

FIG. 2 is a block diagram illustrating a rough outline of the structure of a fuel cell system according to a second embodiment. The second embodiment is formed by modifying the configuration of the first cathode combustion pipe 16 of the first embodiment that serves as a cathode bypass passage. In the second embodiment, the parts thereof corresponding to those of FIG. 1 are identified by the same reference numerals as in FIG. 1 and a detailed description thereof is omitted herein.

As seen from FIG. 2, the second embodiment differs from the first embodiment in the following points. The first cathode combustion pipe 16 for connecting the outlet of the cathode 1c to the combustion air feed passage 50 in order to send the power generation material gas discharged from the cathode 1c of the fuel cell 1 to the combustor 4 after mixed with combustion air is replaced with a second cathode combustion pipe 19 for connecting the outlet of the cathode 1c located on the upstream side of the first outlet-side opening/closing valve 12a to the fuel gas back flow pipe 25 located on the downstream side of the back flow pipe valve 15 in order to send the power generation material gas discharged from the cathode 1c of the fuel cell 1 to the combustor 4 after mixed with the fuel gas. The first combustion pipe opening/closing valve 17 disposed on the first cathode combustion pipe 16 is replaced with a second combustion pipe opening/closing valve 20 disposed on the second cathode combustion pipe 19.

During the power generation period of the fuel cell system 39, while the reformer of the fuel processor 2 being kept at a temperature of about 700° C., a reforming reaction within the reformer is caused between the power generation material gas supplied from the material gas feeder 6 and water supplied from the water feeder 3, these feeders being controlled by the controller 21, so that hydrogen-rich fuel gas is generated. The fuel gas coming out from the fuel processor 2 passes through the flow path switching device 14 disposed in the anode feed pipe 24 (the flow path switching device 14 is controlled by the controller 21 such that the anode feed pipe 24 is communicated with the anode 1a) and is then introduced into the anode 1a of the fuel cell 1. The air coming out from the blower 5 passes through the second inlet-side opening/closing valve 12b in its open state through the cathode feed pipe 7 and is then introduced into the cathode 1c of the fuel cell 1. In the fuel cell 1, hydrogen contained in the fuel gas and oxygen contained in the air are thus consumed, thereby generating electric power. The remaining fuel gas which has not been consumed in the power generation of the fuel cell 1 is sent to the combustor 4 after passing through the back flow pipe valve 15 by way of the fuel gas back flow pipe 25. Then, the remaining fuel gas is combusted within the combustor 4 to generate heat that is utilized as a heat source for heating the reformer of the fuel processor 2. The remaining air, which has not been consumed in the power generation of the fuel cell 1, is discharged to the atmosphere after passing through the first outlet-side opening/closing valve 12a in its open state by way of the cathode exhaust pipe 8.

At a stop of the power generation of the fuel cell system 39, the controller 21 stops the operation of the blower 5 so that the supply of air from the blower 5 to the cathode 1c is stopped, while closing the second inlet-side opening/closing valve 12b and the first outlet-side opening/closing valve 12a and opening the second combustion pipe opening/closing valve 20.

The controller 21 controls the flow path switching device 14 so as to form a bypass flow path (the passage for communicating the anode feed pipe 24 with the anode bypass pipe 13) and close the valve 15. In this way, the fuel gas (hydrogen-rich gas) staying in the anode 1a of the fuel cell 1 can be sealed in the anode 1a. While maintaining this condition, the supply of the fuel gas from the fuel processor 2 to the anode 1a is stopped.

At that time, the material gas feeder 6 continues the supply of the power generation material gas to continue the combustion in the combustor 4, while the controller 21 operates the material cathode feeder 11 to guide the power generation material gas (flammable gas) to the cathode feed pipe 7 located on the downstream side of the second inlet-side opening/closing valve 12b by way of the material cathode feed pipe 22. The power generation material gas is then supplied to the cathode 1c of the fuel cell 1 through the cathode feed pipe 7.

Since the amount of air staying in the cathode 1c can be grasped beforehand, the amount of power generation material gas to be supplied to the cathode 1c of the fuel cell 1 by the material cathode feeder 11 can be set to a value (that is normally two or three times the inner volume) equal to or greater than the amount of the air by the controller 21.

Herein, the pressure of the power generation material gas within the area of the material feed pipe 23 which area is close to the outlet of the material gas feeder 6 is raised by about 2 kPa. Therefore, the power generation material gas can be allowed to flow from the cathode feed pipe 7 located on the downstream side of the second inlet-side opening/closing valve 12b into the cathode 1c with the use of the inner pressure of the power generation material gas, by opening the flow rate regulating valve disposed in the material cathode feed pipe 22 as the material cathode feeder 11, in a condition where one end of the material cathode feed pipe 22 is connected to the area of the material feed pipe 23 close to the outlet of the material gas feeder 6 whereas the other end is connected to the cathode feed pipe 7 located on the downstream side of the second inlet-side opening/closing valve 12b. If the supply pressure used for supplying the power generation material is insufficient, a feed pump may be used as the material cathode feeder 11 to forcibly send the power generation material gas into the cathode 1c by pumping.

The fuel gas supplied from the fuel gas back flow pipe 25 to the combustor 4 can be joined with the power generation material gas that flows in the fuel gas back flow pipe 25 from the cathode 1c of the fuel cell 1 by way of the second cathode combustion pipe 19, by supplying the power generation material gas to the cathode 1c of the fuel cell 1 with the material cathode feeder 11. In short, the power generation material gas discharged from the cathode 1c is sent onto the fuel gas back flow pipe 25 by way of the second cathode combustion pipe 19, so that the power generation material gas is mixed with the fuel gas and transferred to the combustor 4 for combustion.

The flow rate of the air supplied to the combustor 4 after flowing in the fuel gas back flow pipe 25 is set by the controller 21 such that the flammable gas concentration of the mixed gas comprised of the flammable gas (that is hydrogen gas contained in the fuel gas flowing in the fuel gas back flow pipe 25) and air in the fuel gas back flow pipe 25 is out of the combustible range and more preferably greater than the upper combustible limit in order to prevent a back fire from occurring in the fuel gas back flow pipe 25.

For example, the controller 21 controls the amount of power generation material gas to be supplied to the cathode 1c or the amount of fuel gas flowing in the fuel gas back flow pipe 25, such that, in the power generation stop period of the fuel cell system 39 during which the air existing in the cathode 1c of the fuel cell 1 is replaced with the power generation material gas, the ratio of the flow rate of the flammable gas contained in the fuel gas to the sum of the flow rate of the air discharged from the cathode 1c and the flow rate of the flammable gas is out of the combustible range of the flammable gas and, more preferably, greater than its upper combustible limit based on a mixture of the flammable gas and air.

The above control is performed based on such a concept that when air flows from the second cathode combustion pipe 19 into the fuel gas back flow pipe 25 filled with the fuel gas (more particularly, just after the replacement of the gas in the cathode 1c with the power generation material gas), the combustion of the flammable gas can be more easily controlled by adjusting the flow rate of the air (i.e., the flow rate of the power generation material gas used in the air replacement in the cathode 1c) such that the flammable gas concentration of the mixed gas becomes greater than the upper combustible limit, thereby making the flammable gas concentration of the mixed gas become out of the combustible range. The reason for this is that if the flow rate of the air (i.e., the flow rate of the power generation material gas) is adjusted to a value below the lower combustible limit, the flammable gas concentration of the mixed gas in the fuel gas back flow pipe 25 will temporarily fall in the combustible range before it becomes equal to the lower combustible limit.

Therefore, since the chief component of the fuel gas is hydrogen and hydrogen has a combustible range of about 4 to 75% when mixed with air, the flow rate of the air supplied to the combustor 4 after flowing in the fuel gas back flow pipe 25, in other words, the flow rate of the power generation material gas supplied from the material cathode feeder 11 is adjusted by the controller 21 to a value less than one fourth of the flow rate of the fuel gas supplied from the fuel gas back flow pipe 25 to the combustor 4.

For any of the flammable gas components contained in the fuel gas flowing in the fuel gas back flow pipe 25, the flow rate control for preventing a back fire as described above is performed so as to satisfy the above conditions. In this embodiment, most of the flammable gas contained in the fuel gas flowing in the fuel gas back flow pipe 25 is hydrogen and the combustible range of hydrogen when mixed with air is 4 to 75 vol %. Since the lower and upper combustible limits of hydrogen are both strict compared to those of the unreformed power generation material (city gas 13A) that is another flammable gas component of the fuel gas, the flow rate of hydrogen gas contained in the fuel gas is employed as the flammable gas flow rate of the fuel gas. For more reliable safety, the flow rate of the fuel gas may be used in place of the flow rate of hydrogen gas contained in the fuel gas.

Similarly to the first embodiment, the combustion fan 18 is controlled, at that time, by the controller 21 so as to send air to the combustor 4 in such an amount that at least a mixture of the power generation material gas and the fuel gas sent to the combustor 4 is perfectly combusted (i.e., an amount that makes the air to fuel ratio within the combustor 4 be 1 or more).

During the replacement of the air within the cathode 1c of the fuel cell 1 with the power generation material gas in the power generation stop operation described above, it is preferable to control the output of the combustion fan 18 by the controller 21 similarly to the first embodiment such that air is sent to the combustor 4 in an amount more than that required to perfectly combust the mixture of the power generation material gas and the fuel gas which mixture is sent to the combustor 4. Thereby, the temperature rise of the reformer can be restrained by the air cooling effect of the combustion air supplied from the combustion fan 18. It should be noted that a large amount of air such as described above may be supplied in a continuous manner in the course of the replacement of the air within the cathode 1c of the fuel cell 1 with the power generation material gas. Alternatively, air may be supplied by increasing the output of the combustion fan 18 according to rises in the temperature of the reformer, so that the increase of the temperature of the reformer is restrained.

It is desirable in the light of energy efficiency that, similarly to the first embodiment, the controller 21 perform control instead of the above operation during the power generation stop period such that: prior to the replacement of the air within the cathode 1c of the fuel cell 1 with the power generation material gas, the flow rate of the power generation material gas from the material gas feeder 6 drops to a value lower than the flow rate for the normal operation in order to lower the temperature of the reformer to a value (e.g., 620° C.) below a specified target temperature (e.g., 650° C.) for the normal operation, and during the replacement of the air within the cathode 1c with the power generation material gas, the temperature of the reformer does not exceed the upper limit (e.g., 750° C.) of the temperature range that ensures the heat resistance of the reforming catalyst.

At the time when the amount of power generation material gas supplied to the cathode 1c of the fuel cell 1 by the material cathode feeder 11 has reached a value equal to or more than the inner volume of the cathode 1c (this value is usually two or three times the inner volume), the controller 21 stops the supply of the power generation material gas by the material gas feeder 6 and the material cathode feeder 11, closes the second combustion pipe opening/closing valve 20 and stops the combustion fan 18.

After stopping the power generation through the above procedure, the hydrogen-rich fuel gas is introduced into the anode 1a and kept in this condition, while the power generation material gas, which is flammable gas, being kept in the cathode 1c, so that the oxidative degradation of the anode 1a can be prevented.

Next, at a start of the power generation of the fuel cell system 39 (start-up of the system 39), the power generation material gas is supplied from the material gas feeder 6 into the reformer of the fuel processor 2 through the material feed pipe 23, while the flow path switching device 14 being controlled by the controller 21 so as to form the bypass passage. Then, the gas, which has come out from the fuel processor 2 after passing therethrough, goes to the anode bypass pipe 13 and the fuel gas back flow pipe 25 by way of the flow path switching device 14 and then to the combustor 4 where it is combusted. Meanwhile, the reformer within the fuel processor 2 is supplied with water by the water feeder 3 controlled by the controller 21. Thereafter, the temperature of the reformer of the fuel processor 2 is raised to about 700° C. by the combustion heat of the combustor 4 so that the reformer can be kept in a temperature condition in which hydrogen-rich fuel gas can be generated from the power generation material gas and vapor.

At the time when the temperature of the carbon monoxide removing section (not shown) housed in the fuel processor 2 has reached the reaction stabilization temperature, thereby reducing the carbon monoxide concentration of the fuel gas to such a degree (about 20 ppm) that the anode electrode of the fuel cell 1 does not degrade, the controller 21 opens the back flow pipe valve 15 placed in the fuel gas back flow pipe 25 and switches the flow path switching device 14 from the side of the anode bypass pipe 13, thereby forming the feed flow path for the anode 1a. In this condition (where the anode feed pipe 24 is communicated with the anode 1a), the fuel gas coming out from the fuel processor 2 is guided to the anode 1a of the fuel cell 1 through the flow path switching device 14 and the remaining gas which has not been consumed in the anode 1a is allowed to flow back to the combustor 4 through the fuel gas back flow pipe 25 and the back flow pipe valve 15 and then combusted within the combustor 4. Thereby, a supply of gas to the anode 1a of the fuel cell 1 is resumed to enable power generation.

At the same time, the controller 21 opens the second inlet-side opening/closing valve 12b of the cathode shut-up device 12 and the second combustion pipe opening/closing valve 20 to start air blasting by the blower 5.

At that time, the flow rate of the air sent from the cathode 1c of the fuel cell 1 to the combustor 4 through the second cathode combustion pipe 19 by the blower 5 is adjusted by the controller 21 to a value less than one fourth of the flow rate of the fuel gas supplied from the fuel gas back flow pipe 25 to the combustor 4, so that the flammable gas concentration of the mixture of the fuel gas and air within the fuel gas back flow pipe 25 becomes greater than the upper combustible limit, like the case described earlier.

For example, the controller 21 controls the amount of air supplied to the cathode 1c or the amount of fuel gas flowing in the fuel gas back flow pipe 25, such that, in the power generation start period of the fuel cell system 39 during which the power generation material gas existing in the cathode 1c of the fuel cell 1 is replaced with air, the ratio of the flow rate of the flammable gas contained in the fuel gas to the sum of the flow rate of the air discharged from the cathode 1c and the flow rate of the flammable gas is out of the combustible range of the flammable gas and, more preferably, greater than its upper combustible limit based on a mixture of the flammable gas and air.

For any of the flammable gas components contained in the fuel gas flowing in the fuel gas back flow pipe 25, the flow rate control for preventing a back fire as described above is performed so as to satisfy the above conditions. In this embodiment, most of the flammable gas contained in the fuel gas flowing in the fuel gas back flow pipe 25 is hydrogen and the combustible range of hydrogen when mixed with air is 4 to 75 vol %. Since the lower and upper combustible limits of hydrogen are both strict compared to those of the unreformed power generation material (city gas 13A) that is another flammable gas component of the fuel gas, the flow rate of hydrogen gas contained in the fuel gas is employed as the flow rate of flammable gas of the fuel gas. For more reliable safety, the flow rate of the fuel gas may be used in place of the flow rate of hydrogen gas contained in the fuel gas.

Further, the amount of air sent to the combustor 4 by the combustion fan 18 is kept by the cathode 1c similarly to the first embodiment during the power generation stop period. When the blower 5 starts to send air to the cathode 1c, the amount of air, which at least enables perfect combustion of the power generation material gas discharged from the second cathode combustion pipe 19 from the beginning (i.e., just after the replacement of the gas within the cathode 1c with air) and the fuel gas contained in the mixed gas sent from the fuel gas back flow pipe 25, becomes necessary. That is, the combustion fan 18 is controlled by the controller 21 so as to send air to the combustor 4 in such an amount that the power generation material gas and fuel gas sent to the combustor 4 can be perfectly combusted.

During the replacement of the power generation material gas within the cathode 1c of the fuel cell 1 with air in the power generation start operation described above, it is preferable to control the output of the combustion fan 18 by the controller 21 similarly to the first embodiment such that air is sent to the combustor 4 in an amount more than that required to perfectly combust the mixture of the power generation material gas and the fuel gas which mixture is sent to the combustor 4. Thereby, the temperature rise of the reformer can be restrained by the air cooling effect of the combustion air supplied from the combustion fan 18. It should be noted that a large amount of air such as described above may be supplied in a continuous manner in the course of the replacement of the air within the cathode 1c of the fuel cell 1 with the power generation material gas. Alternatively, air may be supplied by increasing the output of the combustion fan 18 according to rises in the temperature of the reformer so that the increase of the temperature of the reformer is restrained.

It is desirable in the light of energy efficiency that the controller 21 perform control instead of the above operation during the power generation stop period such that: prior to the replacement of the air within the cathode 1c of the fuel cell 1 with the power generation material gas, the flow rate of the power generation material gas from the material gas feeder 6 drops to a value lower than the flow rate for the normal operation in order to lower the temperature of the reformer to a value (e.g., 620° C.) below a specified target temperature (e.g., 650° C.) for the normal operation, and during the replacement of the power generation material gas within the cathode 1c with air, the temperature of the reformer does not exceed the upper limit (e.g., 750° C.) of the temperature range that ensures the heat resistance of the reforming catalyst. After completion of the replacement of the power generation material gas in the cathode 1c with air, the flow rate of the power generation material gas is increased to the value of the flow rate for the normal operation.

After the replacement of the power generation material gas in the cathode 1c of the fuel cell 1 with air, the controller 21 opens the first outlet-side opening/closing valve 12a of the cathode shut-up device 12 and closes the second combustion pipe opening/closing valve 20; the air supply amount of the blower 5 is set to a value required for the power generation of the fuel cell 1; and then, the power generation of the fuel cell 1 is started.

Thus, the power generation material gas discharged from the cathode 1c of the fuel cell 1 at the time of a start or stop of the power generation of the fuel cell system 39 is sent from the second cathode combustion pipe 19 to the combustor 4 by way of the fuel gas back flow pipe 25, whereby the power generation material gas discharged from the cathode 1c can be completely combusted and discharged from the fuel cell system 39.

The flow rate of the air sent from the second cathode combustion pipe 19 to the combustor 4 by way of the fuel gas back flow pipe 25 is adjusted by the controller 21 to a value less than one fourth of the flow rate of the fuel gas supplied from the fuel gas back flow pipe 25 to the combustor 4, thereby enabling proper operation free from the risk of a back fire that occurs from the combustor 4 toward the fuel gas back flow pipe 25.

Further, since the condition where the cathode 1c of the fuel cell 1 is filled with the power generation material gas can be maintained during the power generation stop period of the fuel cell system 39, not only the flammable gas (fuel gas) can be sealed in the anode 1a but also the cause of the oxidation of the catalyst of the anode 1a of the fuel cell 1 can be thoroughly eliminated, so that the durability of the anode 1a of the fuel cell system 39 can be prevented from decreasing.

In the first embodiment (FIG. 1) and the second embodiment (FIG. 2) described earlier, the power generation material gas supplied from the material gas feeder 6 to the anode 1a is used as one example of the flammable gas with which the cathode 1c is filled during the power generation stop period of the fuel cell system 39.

Either the power generation material gas or the fuel gas may be arbitrarily selected as the flammable gas according to changes in the arrangement of specified pipes. It is thought to be desirable in view of the durability of the platinum catalyst to fill the cathode 1c with a gas having the highest possible hydrogen gas concentration. However, hydrogen gas should be more carefully treated when discharged to the atmosphere, because the combustible range of hydrogen gas is wider than those of other flammable gases.

Although air is used as the oxidizing gas in the foregoing embodiments, the oxidizing gas is not necessarily limited to air and other gases may be used. In the latter case, during the period in which the oxidizing gas existing in the cathode 1c of the fuel cell 1 is replaced with the power generation material gas or the power generation material gas in the cathode 1c is replaced with the oxidizing gas (i.e., the power generation stop period or the power generation start period), the controller 21 controls the amount of gas to be supplied to the cathode 1c or the supply amount of fuel gas flowing in the fuel gas back flow pipe 25 such that the ratio of the flow rate of the flammable gas contained in the fuel gas to the sum of the flow rate of oxygen contained in the gas discharged from the cathode 1c and the flow rate of the flammable gas is out of the combustible range of the flammable gas and, more preferably, greater than its upper combustible limit based on a mixture of the flammable gas and oxygen.

Third Embodiment

Figure 3:
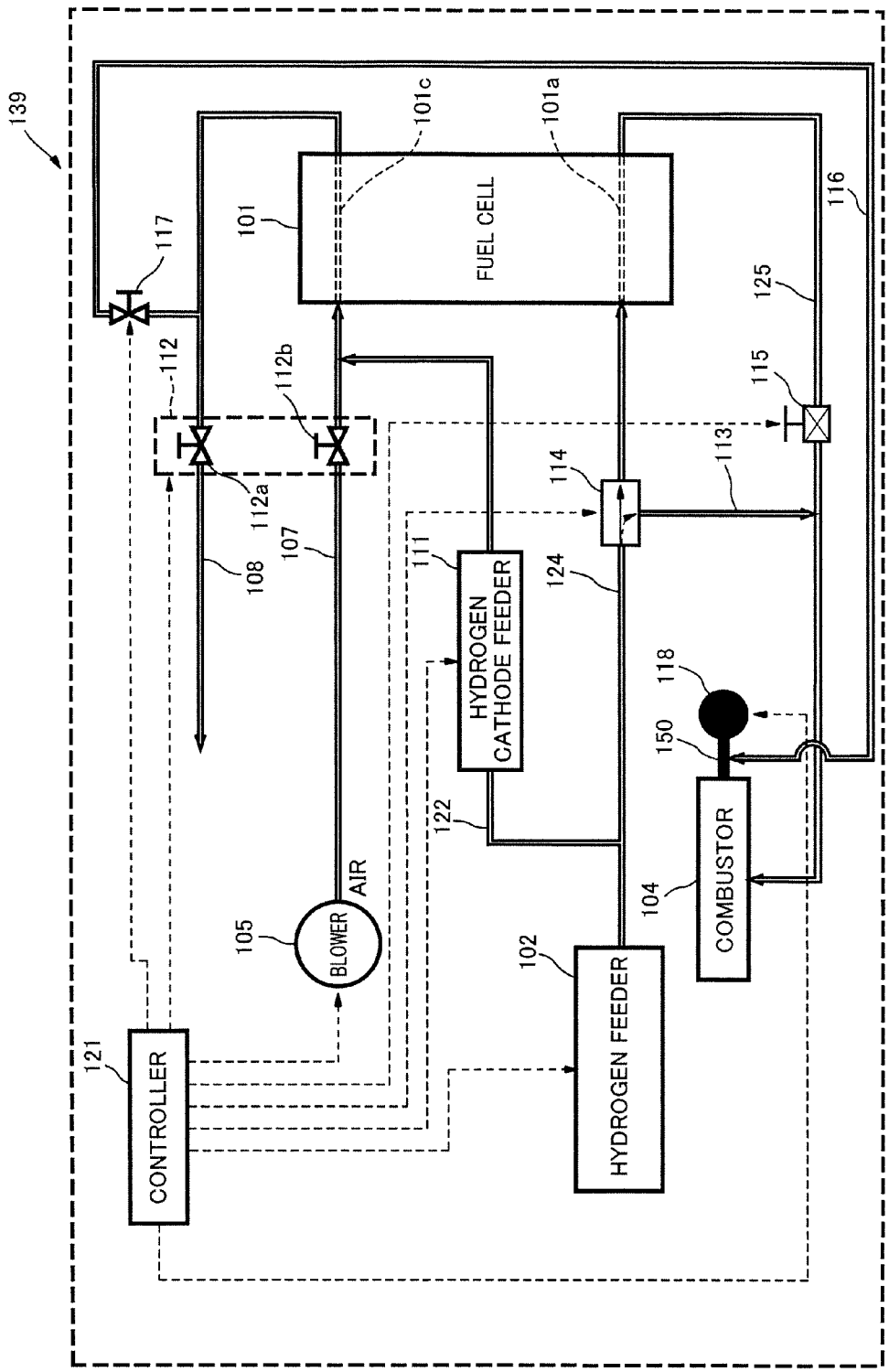
FIG. 3 is a block diagram illustrating a rough outline of the structure of a fuel cell system according to a third embodiment.

FIG. 3 is a block diagram illustrating a rough outline of the structure of a fuel cell system according to a third embodiment. The fuel cell system 139 of the third embodiment is formed by modifying the gas supply system of the fuel cell 1 shown in the first embodiment (FIG. 1). In the third embodiment, a detailed description of parts corresponding to those of FIG. 1 is omitted. (It should be noted that the parts corresponding to FIG. 1 are indicated with the same reference numerals as in the first embodiment with addition of the number 100).

As seen from FIGS. 1 and 3, in the fuel cell system 139 of the third embodiment, a hydrogen feeder 102 is disposed in place of the fuel processor 2, the material gas feeder 6 and the water feeder 3 which have been described earlier in the first embodiment (FIG. 1). The hydrogen feeder 102 is capable of storing a fixed quantity of hydrogen gas serving as the fuel gas and sending the hydrogen gas to an anode 101a of a fuel cell 101. In addition, a combustor 104 is disposed in place of the combustor 4 for heating the fuel processor (reformer) 2 described in the first embodiment (FIG. 1), the dedicated combustor 104 being used for processing the hydrogen gas discharged from a cathode 101c of the fuel cell 101 (described later) at a stop or start-up of the fuel cell system 139. It should be noted that the hydrogen cathode feeder 111 (that corresponds to the material cathode feeder 11 of the first embodiment) shown in FIG. 3 functions to supply hydrogen gas to the cathode 101c.

During the power generation period of the fuel cell system 139, the hydrogen gas coming out from the hydrogen feeder 102 passes through a flow path switching device 114 disposed in an anode feed pipe 124 (the flow path switching device 114 is controlled by a controller 121 so as to communicate the anode feed pipe 124 with the anode 101a) and is then sent into the anode 101a of the fuel cell 101.

On the other hand, the air sent from the blower 105 passes through a second inlet-side opening/closing valve 112b in its open state by way of a cathode feed pipe 107 and is then sent into the cathode 101c of the fuel cell 101.

Thus, hydrogen and oxygen contained in the air are consumed, thereby executing power generation within the fuel cell 101. The remaining hydrogen gas (combustion gas), which has not been consumed in the power generation of the fuel cell 101, is sent to the combustor 104 after passing through a back flow pipe valve 115 in its open state by way of a hydrogen gas back flow pipe 125 and is then combusted within the combustor 104. Alternatively, the hydrogen gas (combustion gas) coming out from the hydrogen feeder 102 may be sent from the hydrogen gas back flow pipe 125 to the combustor 104 by the switching operation (for communicating the anode feed pipe 124 with an anode bypass pipe 113) of the flow path switching device 114.

The combustion heat (exhaust heat) generated in the combustor 104 may be recovered and used as a heat source for an appropriate exhaust heat utilization system (e.g., hot water supply system).

The remaining air, which has not been consumed in the power generation of the fuel cell system 101, is discharged to the atmosphere after passing through the first outlet-side opening/closing valve 112a in its open state by way of a cathode exhaust pipe 108.

When stopping the power generation of the fuel cell system 139, the controller 121 controls a blower 105 to stop its operation, thereby stopping the supply of air from the blower 105 to the cathode 101c, and closes the second inlet-side opening/closing valve 112b and the first outlet-side opening/closing valve 112a, while opening a first combustion pipe opening/closing valve 117.

The controller 121 controls the flow path switching device 114 to form a bypass flow path (a passage for communicating the anode feed pipe 124 with the anode bypass pipe 113) and closes the valve 115. In this way, the hydrogen gas staying in the anode 101a of the fuel cell 101 is sealed within the anode 101a and in this condition; the supply of hydrogen gas from the hydrogen feeder 102 to the anode 101a is stopped.

At that time, the hydrogen feeder 102 continues the supply of hydrogen gas thereby continuing the combustion in the combustor 104, while the controller 121 operates a hydrogen cathode feeder 111 such that hydrogen gas (i.e., flammable gas) is guided into the cathode feed pipe 107 located on the downstream side of the second inlet-side opening/closing valve 112b through a hydrogen cathode feed pipe 122 and supplied to the cathode 101c of the fuel cell 101 through the cathode feed pipe 107.

The amount of hydrogen gas supplied to the cathode 101c of the fuel cell 101 by the hydrogen cathode feeder 111 is set by the controller 121 to a value that is about two or three times the inner volume of the cathode 101c, and the air in the cathode 101c is thoroughly replaced with the hydrogen gas that is a flammable gas. At that time, the hydrogen gas exceeding the inner volume of the cathode 101c is supplied onto a combustion air feed passage 150 by way of a first cathode combustion pipe 116, whereby the hydrogen gas and combustion air are mixed with each other and transferred to the combustor 104 where they are combusted.

Herein, the pressure of the hydrogen gas within the area of the anode feed pipe 124 which area is close to the outlet of the hydrogen feeder 102 is raised by about 2 kPa. Therefore, the hydrogen gas can be allowed to flow into the cathode 101c from the cathode feed pipe 107 located on the downstream side of the second inlet-side opening/closing valve 112b with the use of the inner pressure of the hydrogen gas, by opening the flow rate regulating valve, which serves as the hydrogen cathode feeder 111 and is disposed in the hydrogen cathode feed pipe 122, in a condition where one end of the hydrogen cathode feed pipe 122 is connected to the area of the anode feed pipe 124 close to the outlet of the hydrogen gas feeder 102 whereas the other end is connected to the cathode feed pipe 107 located on the downstream side of the second inlet-side opening/closing valve 112b. If the supply pressure used for supplying the hydrogen gas is insufficient, a feed pump may be used as the hydrogen cathode feeder 111 to forcibly send the hydrogen gas into the cathode 101c by pumping.

The flow rate of the combustion air supplied by a combustion fan 118 and the flow rate of the hydrogen gas supplied to the hydrogen cathode feeder 111 are set by the controller 121 to such values that the flammable gas concentration of the mixture of them is out of the combustible range and more preferably lower than the lower combustible limit.

For example, the controller 121 may control the amount of hydrogen gas supplied to the cathode 101c or the amount of combustion air supplied from the combustion fan 118, such that, in a power generation stop period of the fuel cell system 139 during which the air existing in the cathode 101c of the fuel cell 101 is replaced with the hydrogen gas, the ratio of the flow rate of the hydrogen gas discharged from the cathode 101c to the sum of the flow rate of the hydrogen gas and the flow rate of the combustion air is out of the combustible range of hydrogen gas and, more preferably, lower than its lower combustible limit based on a mixture of hydrogen gas and air.

The above control is performed based on such a concept that the combustion of the flammable gas can be more easily controlled by adjusting the flow rate of the hydrogen gas to a value lower than the lower combustible limit to make the flammable gas concentration of the mixed gas be out of the combustible range when feeding the hydrogen gas to the combustion air feed passage 150 filled with air. The reason for this is that if the flow rate of the hydrogen gas is adjusted to a value exceeding the upper combustible limit, the flammable gas concentration of the mixed gas in the combustion air feed passage 150 will temporarily fall in the combustible range before it becomes greater than the upper combustible limit.

Since hydrogen gas has a combustible range of about 4 to 75% when mixed with air, the flow rate of the hydrogen gas supplied from the hydrogen cathode feeder 111 controlled by the controller 121 is preferably adjusted to a value less than one twenty-fifth of the flow rate of the combustion air supplied from the combustion fan 118.

The above flow rate of the hydrogen gas may be derived from the flow rate of the hydrogen gas contained in the gas discharged from the cathode 101c. For more reliable safety, it may be equal to the flow rate of cathode off gas discharged from the cathode 101c on assumption that all of the gas discharged from the cathode 101c is hydrogen gas.

The amount of air sent to the combustor 104 by the combustion fan 118 should be such an amount that at least all of the hydrogen gas discharged from the first cathode combustion pipe 116 and the hydrogen gas sent from the hydrogen gas back flow pipe 125 can be perfectly combusted. In other words, it is necessary to send air in an amount that makes the air-fuel ratio within the combustor 104 with respect to a total amount of hydrogen (i.e., the sum of the hydrogen gas discharged from the first cathode combustion pipe 116 and the hydrogen gas sent from the hydrogen gas back flow pipe 125) be 1 or more. Accordingly, the combustion fan 118 is controlled by the controller 121 so as to send air to the combustor 104 in an amount that at least enables perfect combustion of the total hydrogen sent to the combustor 4 (an amount that makes the air-fuel ratio within the combustor 104 be 1 or more). It should be noted that the air-fuel ratio is the ratio $(A/A_0)$ of the actual supply amount of air to the theoretical amount of air (the minimum amount of air necessary for perfect fuel combustion) $A_0$ and that if the air-fuel ratio is less than 1, imperfect fuel combustion is likely to occur.

In the above description, the amount of hydrogen gas supplied to the combustion air feed passage 150 through the first cathode combustion pipe 116 is adjusted to a value less than one twenty-fifth of the flow rate of the combustion air supplied by the combustion fan 118 by controlling the opening of the flow rate regulating valve of the hydrogen cathode feeder 111. Instead, it may be adjusted to a value less than one twenty-fifth of the flow rate of the combustion air, by controlling the output of the combustion fan 118.

At that time, the combustion fan 118 is controlled by the controller 121 so as to send air to the combustor 104 in such a proper amount that the total hydrogen gas sent to the combustor 104 is completely combusted and the hydrogen gas concentration of the mixture of combustion air and hydrogen gas within the combustion air feed passage 150 becomes less than the lower combustible limit.

At the time when the amount of hydrogen gas supplied to the cathode 101c of the fuel cell 101 by the hydrogen cathode feeder 111 has reached a value that is about two or three times the inner volume of the cathode 101, the controller 121 controls the hydrogen feeder 102 and the hydrogen cathode feeder 111 so as to stop the supply of hydrogen gas and closes the first combustion pipe opening/closing valve 117, so that the combustion fan 118 stops.

After stopping the power generation through the above procedure, hydrogen gas, which serves as the power generation gas, can be kept staying in the anode 101a, while hydrogen gas, which is a flammable gas, is kept staying in the cathode 101c, so that the oxidative degradation of the anode 101a can be prevented.

When starting the power generation of the fuel cell system 139 (start-up of the system 139), the controller 121 opens the back flow pipe valve 115 disposed in the hydrogen gas back flow pipe 125 and switches the flow path switching device 114 from the side of the anode bypass tube 113 to form a feed flow path for the anode 101a. In this condition (in which the anode feed pipe 124 is communicated with the anode 101a), the hydrogen gas, which has been sent from the hydrogen feeder 102, is guided to the anode 101a of the fuel cell 101 through the flow path switching device 114 and the remaining hydrogen gas which has not been consumed in the anode 101a is allowed to flow back to the combustor 104 through the hydrogen gas back flow pipe 125 and the back flow pipe valve 115 to combust the remaining fuel gas within the combustor 4, so that a supply of gas to the anode 1a of the fuel cell 1 is resumed to enable power generation.

At the same time, the second inlet-side opening/closing valve 112b of the cathode shut-up device 112 and the first combustion pipe opening/closing valve 117 are opened by the controller 121 to start air blasting by the blower 105.

At that time, the flow rate of the air supplied to the cathode 101c of the fuel cell 101 by the blower 105 becomes equal to the flow rate of the hydrogen gas forced out from the first cathode combustion pipe 116 toward the combustor 104 by the air supplied to the cathode 101c. Therefore, the flow rate of the air, which is supplied by the blower 105 such that the flammable gas concentration of the mixed gas within the combustion air feed passage 150 becomes lower than the lower combustible limit similarly to the above case, is adjusted by the controller 121 to a value less than one twenty-fifth of the flow rate of the combustion air supplied by the combustion fan 118.

For example, the controller 121 may control the amount of air to be supplied to the cathode 101c or the amount of combustion air supplied from the combustion fan 118, such that, in the power generation start period of the fuel cell system 139 during which the hydrogen gas existing in the cathode 101c of the fuel cell 101 is replaced with air, the ratio of the flow rate of the hydrogen gas discharged from the cathode 101c to the sum of the flow rate of the hydrogen gas and the flow rate of the combustion air is out of the combustible range of hydrogen gas and, more preferably, lower than its lower combustible limit based on a mixture of hydrogen gas and air.

The above flow rate of the hydrogen gas may be derived from the flow rate of the hydrogen gas contained in the gas discharged from the cathode 101c. For more reliable safety, it may be equal to the flow rate of cathode off gas discharged from the cathode 101c on assumption that all of the gas discharged from the cathode 101c is hydrogen gas.

The amount of air sent to the combustor 104 should be such an amount that at least all the hydrogen gas discharged from the first cathode combustion pipe 116 and the hydrogen gas sent from the hydrogen gas back flow pipe 125 can be perfectly combusted (i.e., the air amount with which the air-fuel ratio within the combustor 104 is 1 or more). Specifically, the combustion fan 118 is controlled by the controller 121 so as to send air to the combustor 104 in such an amount that at least perfect combustion of all of the hydrogen gas sent to the combustor 104 becomes possible.

In the above description, the amount of hydrogen gas supplied to the combustion air feed passage 150 through the first cathode combustion pipe 116 is adjusted to a value less than one twenty-fifth of the flow rate of the combustion air supplied by the combustion fan 118 by controlling the opening of the flow rate regulating valve of the hydrogen cathode feeder 111. Instead, it may be adjusted to a value less than one twenty-fifth of the flow rate of the combustion air, by controlling the output of the combustion fan 118.

At that time, the combustion fan 118 is controlled by the controller 121 so as to send air to the combustor 104 in such a proper amount that all the hydrogen gas sent to the combustor 104 is perfectly combusted and the hydrogen gas concentration of the mixture of combustion air and hydrogen gas within the combustion air feed passage 150 becomes less than the lower combustible limit.

After the hydrogen gas which has been introduced into the cathode 101c of the fuel cell 101 is replaced with air, the controller 121 opens the first outlet-side opening/closing valve 112a of the cathode shut-up device 112, closes the first combustion pipe opening/closing valve 117, sets the amount of air supplied by the blower 105 to a value necessary for the power generation of the fuel cell 101, and starts the power generation of the fuel cell 101.

As described above, at a start or stop of the power generation of the fuel cell system 139, the hydrogen gas discharged from the cathode 101c of the fuel cell 101 is sent from the first cathode combustion pipe 116 to the combustion air feed passage 150 and mixed with combustion air. This mixed gas is sent to the combustor 104, so that the hydrogen gas discharged from the cathode 101c can be completely combusted and discharged from the fuel cell system 139.

In addition, the flow rate of the hydrogen gas sent from the first cathode combustion pipe 116 to the combustion air feed passage 150 is adjusted by the controller 121 to a value less than one twenty-fifth of the flow rate of combustion air supplied by the combustion fan 118, so that proper operation free from the risk of a back fire that occurs from the combustor 104 toward the combustion air feed passage 150 becomes possible.

Further, since the condition in which the cathode 101c of the fuel cell 101 is filled with hydrogen gas can be maintained during the power generation stop period of the fuel cell system 139, not only the flammable gas (hydrogen gas) can be sealed in the anode 101a but also the cause of the oxidation of the catalyst of the anode 101a of the fuel cell 101 can be thoroughly eliminated, so that the durability of the anode 101a of the fuel cell system 139 can be prevented from decreasing.

Fourth Embodiment

Figure 4:
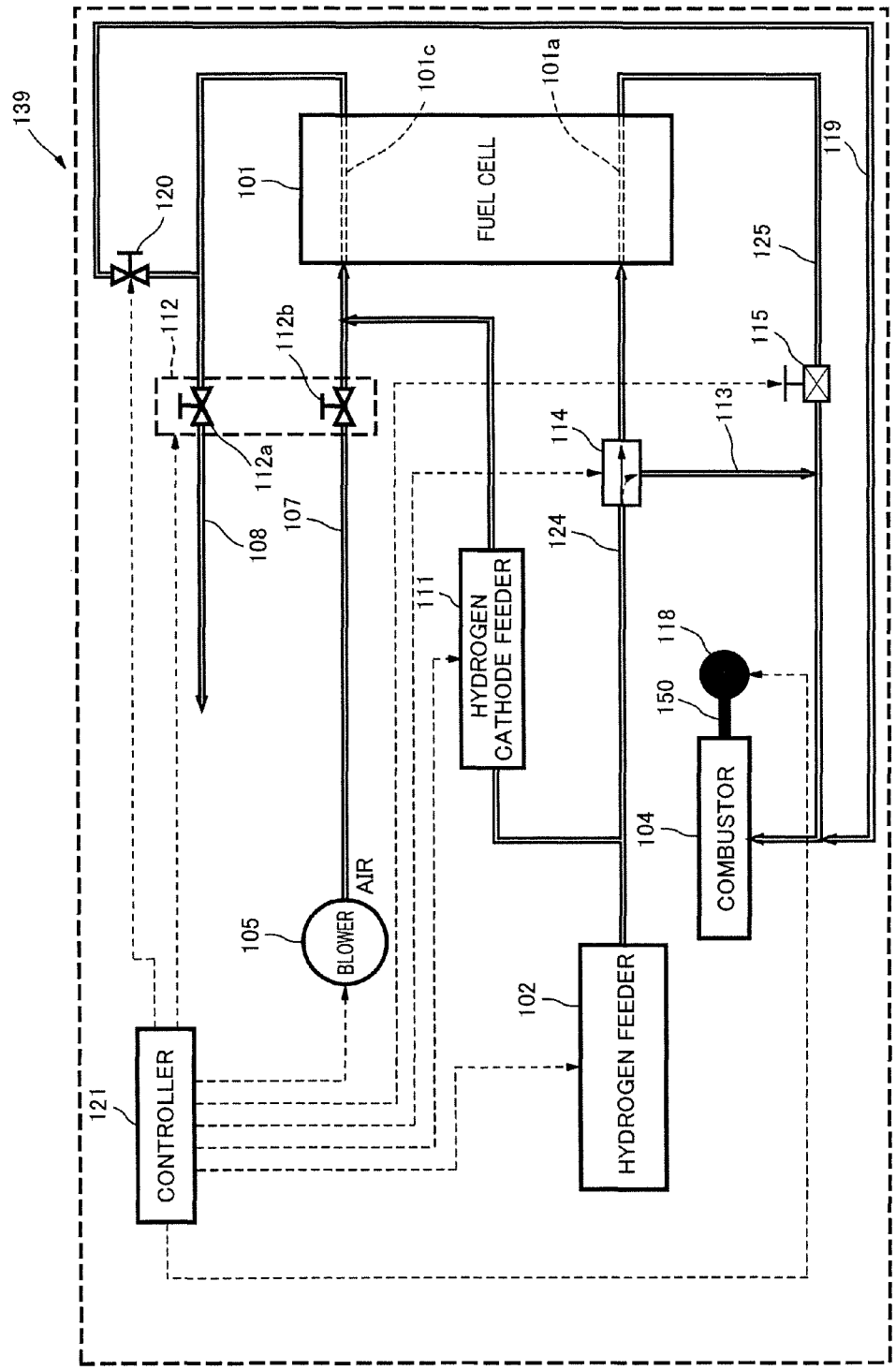
FIG. 4 is a block diagram illustrating a rough outline of the structure of a fuel cell system according to a fourth embodiment.
Figure 5:
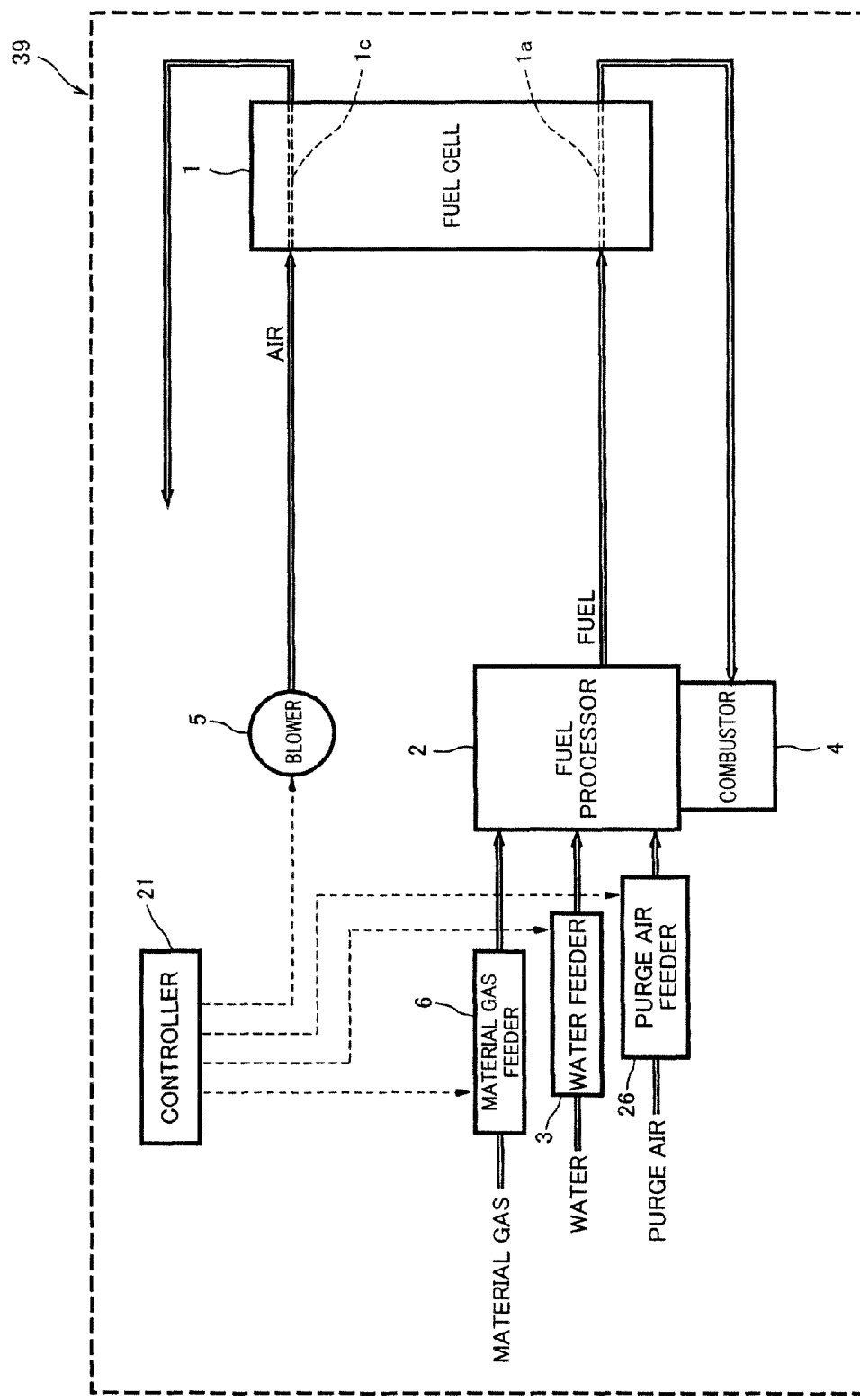
FIG. 5 is a block diagram illustrating a rough outline of the structure of a prior art fuel cell system.

FIG. 4 is a block diagram illustrating a rough outline of the structure of a fuel cell system according to a fourth embodiment. The fuel cell system 139 of the fourth embodiment is formed by modifying the gas supply system of the fuel cell 1 shown in the second embodiment (FIG. 2). In the fourth embodiment, a detailed description of parts corresponding to those of FIG. 2 is omitted. (It should be noted that the parts corresponding to FIG. 2 are indicated with the same reference numerals as in the second embodiment with addition of the number 100).

As seen from FIGS. 2 and 4, in the fuel cell system 139 of the fourth embodiment, a hydrogen feeder 102 is disposed in place of the fuel processor 2, the material gas feeder 6 and the water feeder 3 which are described in the second embodiment (FIG. 2). The hydrogen feeder 102 is capable of storing a fixed quantity of hydrogen gas serving as the fuel gas and sending the hydrogen gas to an anode 101a of a fuel cell 101. In addition, a combustor 104 is disposed in place of the combustor 4 for heating the fuel processor (reformer) 2 described in the second embodiment (FIG. 2), the dedicated combustor 104 being used for processing hydrogen gas discharged from a cathode 101c of the fuel cell 101 (described later) at a stop or start-up of the fuel cell system 139. It should be noted that the hydrogen cathode feeder 111 (that corresponds to the material cathode feeder 11 of the second embodiment) shown in FIG. 4 functions to supply hydrogen gas to the cathode 101c.

During the power generation period of the fuel cell system 139, the hydrogen gas coming out from the hydrogen feeder 102 passes through a flow path switching device 114 disposed in an anode feed pipe 124 (the flow path switching device 114 is controlled by a controller 121 so as to communicate the anode feed pipe 124 with the anode 101a) and is then sent into the anode 101a of the fuel cell 101.

On the other hand, the air sent from the blower 105 passes through a second inlet-side opening/closing valve 112b in its open state by way of a cathode feed pipe 107 and is then sent into the cathode 101c of the fuel cell 101.

Thus, hydrogen and oxygen contained in the air are consumed, thereby executing power generation within the fuel cell 101. The remaining hydrogen gas, which has not been consumed in the power generation of the fuel cell 101, is sent to the combustor 104 after passing through a back flow pipe valve 115 in its open state by way of a hydrogen gas back flow pipe 125 and is then combusted within the combustor 104. The combustion heat (exhaust heat) generated in the combustor 104 may be recovered and used as a heat source for an appropriate exhaust heat utilization system (e.g., hot water supply system).

The remaining air, which has not been consumed in the power generation of the fuel cell system 101, is discharged to the atmosphere after passing through the first outlet-side opening/closing valve 112a in its open state by way of a cathode exhaust pipe 108.

When stopping the power generation of the fuel cell system 139, the controller 121 controls a blower 105 to stop its operation, thereby stopping the supply of air from the blower 105 to the cathode 101c, and closes the second inlet-side opening/closing valve 112b and the first outlet-side opening/closing valve 112a while opening a first combustion pipe opening/closing valve 117.

The controller 121 controls the flow path switching device 114 to form a bypass flow path (a passage for communicating the anode feed pipe 124 with the anode bypass pipe 113) and closes the valve 115. In this way, the hydrogen gas staying in the anode 101a of the fuel cell 101 is sealed within the anode 101a and in this condition; the supply of hydrogen gas from the hydrogen feeder 102 to the anode 101a is stopped.

At that time, the hydrogen feeder 102 continues the supply of hydrogen gas thereby continuing the combustion in the combustor 104, while the controller 121 operates a hydrogen cathode feeder 111 to guide hydrogen gas (i.e., flammable gas) into the cathode feed pipe 107 located on the downstream side of the second inlet-side opening/closing valve 112b by way of a hydrogen cathode feed pipe 122 and supply the hydrogen gas to the cathode 101c of the fuel cell 101 through the cathode feed pipe 107.

The amount of hydrogen gas supplied to the cathode 101c of the fuel cell 101 by the hydrogen cathode feeder 111 is set by the controller 121 to a value that is about two or three times the inner volume of the cathode 101c, and the air in the cathode 101c is thoroughly replaced with the hydrogen gas that is a flammable gas.

Herein, the pressure of the hydrogen gas within the area of the anode feed pipe 124 which area is close to the outlet of the hydrogen feeder 102 is raised by about 2 kPa. Therefore, the hydrogen gas can be allowed to flow into the cathode 101c from the cathode feed pipe 107 located on the downstream side of the second inlet-side opening/closing valve 112b with the use of the inner pressure of the hydrogen gas, by opening the flow rate regulating valve, which serves as the hydrogen cathode feeder 111 and is disposed in the hydrogen cathode feed pipe 122, in a condition where one end of the hydrogen cathode feed pipe 122 is connected to the area of the anode feed pipe 124 close to the outlet of the hydrogen gas feeder 102 whereas the other end is connected to the cathode feed pipe 107 located on the downstream side of the second inlet-side opening/closing valve 112b. If the supply pressure used for supplying the hydrogen gas is insufficient, a feed pump may be used as the hydrogen cathode feeder 111 to forcibly send the hydrogen gas into the cathode 101c by pumping.

The hydrogen gas supplied from the hydrogen gas back flow pipe 125 to the combustor 104 can be joined with the hydrogen gas that flows in the hydrogen gas back flow pipe 125 from the cathode 101c of the fuel cell 101 by way of a second cathode combustion pipe 119, by supplying the hydrogen gas to the cathode 101c of the fuel cell 101 with the hydrogen cathode feeder 111. In short, the hydrogen gas discharged from the cathode 101c is sent onto the hydrogen gas back flow pipe 125 by way of the second cathode combustion pipe 119, so that the hydrogen gases from the two systems are mixed with each other and transferred to the combustor 104 for combustion.

The flow rate of the air supplied to the combustor 104 after flowing in the hydrogen gas back flow pipe 125 is set by the controller 121 such that the flammable gas concentration of the mixed gas comprised of air and flammable gas (that is the hydrogen gas contained in the fuel gas flowing in the hydrogen gas back flow pipe 125) in the hydrogen gas back flow pipe 125 is out of the combustible range and more preferably greater than the upper combustible limit in order to prevent a back fire from occurring in the hydrogen gas back flow pipe 125.

For example, the controller 121 may control the amount of hydrogen gas supplied to the cathode 101c or the amount of fuel gas flowing in the hydrogen gas back flow pipe 125, such that, in the power generation stop period of the fuel cell system 139 during which the air existing in the cathode 101c of the fuel cell 101 is replaced with hydrogen gas, the ratio of the flow rate of the flammable gas contained in the fuel gas to the sum of the flow rate of the air discharged from the cathode 101c and the flow rate of the flammable gas is out of the combustible range of the flammable gas and, more preferably, greater than the upper combustible limit based on a mixture of the flammable gas and air.

The above control is performed based on such a concept that the combustion of the flammable gas can be more easily controlled by adjusting the flow rate of the air (i.e., the flow rate of the hydrogen gas to be used for the air replacement in the cathode 101c) such that the flammable gas concentration of the mixed gas becomes greater than the upper combustible limit to make the flammable gas concentration be out of the combustible range, when air flows from the second cathode combustion pipe 119 into the hydrogen gas back flow pipe 125 filled with the flammable gas (more specifically, just after the replacement of the air in the cathode 101c with hydrogen gas). The reason for this is that if the flow rate of the air (i.e., the flow rate of the hydrogen gas) is adjusted to a value lower than the lower combustible limit, the flammable gas concentration of the mixed gas in the hydrogen gas back flow pipe 125 will temporarily fall in the combustible range before it becomes equal to the lower combustible limit.

Since hydrogen gas has a combustible range of about 4 to 75% when mixed with air, the flow rate of the air that flows in the hydrogen gas back flow pipe 125 and is to be supplied to the combustor 4, that is, the flow rate of the hydrogen gas supplied by the hydrogen cathode feeder 111 is adjusted by the controller 121 to a value less than one fourth of the flow rate of the hydrogen gas supplied from the hydrogen gas back flow pipe 125 to the combustor 104.

For any of the flammable gas components contained in the hydrogen gas flowing in the hydrogen gas back flow pipe 125, the flow rate control for preventing a back fire as described above is performed so as to satisfy the above conditions. In this embodiment, most of the flammable gas contained in the fuel gas flowing in the hydrogen gas back flow pipe 125 is hydrogen and the combustible range of hydrogen when mixed with air is 4 to 75 vol %. Since the lower and upper combustible limits of hydrogen are both strict compared to those of the unreformed power generation material (city gas 13A) that is another flammable gas component of the fuel gas, the flow rate of hydrogen gas contained in the fuel gas is employed as the flow rate of flammable gas of the fuel gas. For more reliable security, the flow rate of the fuel gas may be used in place of the flow rate of hydrogen gas contained in the fuel gas.

Similarly to the third embodiment described earlier, the amount of air sent to the combustor 104 by the combustion fan 118 is adjusted by the controller 121 to such a value that all of the hydrogen gas discharged from the second cathode combustion pipe 119 and the hydrogen gas discharged from the hydrogen gas back flow pipe 125 can be perfectly combusted (i.e., the amount of air with which the air-fuel ratio in the combustor 104 becomes 1 or more).

In this way, at the time when the amount of hydrogen gas supplied to the cathode 101c of the fuel cell 101 by the hydrogen cathode feeder 111 has reached a value equal to or more than the inner volume of the cathode 101c (this value is usually two or three times the inner volume), the controller 121 stops the supply of hydrogen gas by the hydrogen feeder 102 and the hydrogen cathode feeder 111; closes a second combustion pipe opening/closing valve 120; and stops the combustion fan 118.

After stopping the power generation through the above procedure, hydrogen gas, which serves as the power generation gas, is introduced into the anode 101a and kept in this condition, while hydrogen gas, which serves as the flammable gas, being kept in the cathode 101c, so that the oxidative degradation of the anode 101a can be properly prevented.

When starting the power generation of the fuel cell system 139 (start-up of the system 139), the controller 121 opens the back flow pipe valve 115 disposed in the hydrogen gas back flow pipe 125 and switches the flow path switching device 114 from the side of the anode bypass pipe 113 to form a feed flow path for the anode 101a. In this condition (where the anode feed pipe 124 is communicated with the anode 101a), the hydrogen gas coming out from the hydrogen gas feeder 102 is introduced into the anode 101a of the fuel cell 101 through the flow path switching device 114 and the remaining hydrogen gas which has not been consumed in the anode 101a is allowed to flow back to the combustor 104 through the hydrogen gas back flow pipe 125 and the back flow pipe valve 115 and then, combusted within the combustor 104. Thereby, a gas supply to the anode 101a of the fuel cell 101 is resumed to enable power generation.

At the same time, the controller 121 opens the second inlet-side opening/closing valve 112b of the cathode shut-up device 112 and the first combustion pipe opening/closing valve 117 to start air blasting by the blower 105.

At that time, the flow rate of the air sent from the cathode 101c of the fuel cell 101 to the combustor 104 through the second cathode combustion pipe 119 by the blower 105 is adjusted by the controller 121 to a value less than one fourth of the flow rate of the hydrogen gas supplied from the hydrogen gas back flow pipe 125 to the combustor 104, so that the flammable gas concentration of the mixture of hydrogen gas and air within the hydrogen gas back flow pipe 125 becomes greater than the upper combustible limit similarly to the above case.

For example, the controller 121 controls the amount of air supplied to the cathode 101c or the amount of fuel gas flowing in the hydrogen gas back flow pipe 125, such that, in the power generation start period of the fuel cell system 139 during which the hydrogen gas existing in the cathode 101c of the fuel cell 101 is replaced with air, the ratio of the flow rate of the flammable gas contained in the fuel gas to the sum of the flow rate of the air discharged from the cathode 101c and the flow rate of the flammable gas is out of the combustible range of the flammable gas and, more preferably, greater than the upper combustible limit based on a mixture of the flammable gas and air.

For any of the flammable gas components contained in the fuel gas flowing in the hydrogen gas back flow pipe 125, the flow rate control for preventing a back fire as described above is performed so as to satisfy the above conditions. In this embodiment, most of the flammable gas contained in the fuel gas flowing in the hydrogen gas back flow pipe 125 is hydrogen and the combustible range of hydrogen when mixed with air is 4 to 75 vol %. Since the lower and upper combustible limits of hydrogen are both strict compared to those of the unreformed power generation material (city gas 13A) that is another flammable gas component of the fuel gas, the flow rate of hydrogen gas contained in the fuel gas is employed as the flow rate of flammable gas of the fuel gas. For more reliable safety, the flow rate of the fuel gas may be used in place of the flow rate of hydrogen gas contained in the fuel gas.

Further, the amount of air sent to the combustor 104 by the combustion fan 118 is maintained by the cathode 101c similarly to the third embodiment during the power generation stop period. When the blower 105 starts to send air to the cathode 101c, the amount of air, which at least enables perfect combustion of all of the hydrogen gas initially discharged from the second cathode combustion pipe 119 (just after the replacement of the gas within the cathode 101c with air) and the hydrogen gas contained in the mixed gas sent from the hydrogen gas back flow pipe 125, becomes necessary. That is, the combustion fan 118 is controlled by the controller 121 so as to send air to the combustor 104 in such an amount that all of the hydrogen gas sent to the combustor 104 can be completely combusted.

After the hydrogen gas in the cathode 101c of the fuel cell 101 is thus replaced with air, the controller 121 opens the first outlet-side opening/closing valve 112a of the cathode shut-up device 112; closes the second combustion pipe opening/closing valve 120; and sets the amount of air supplied from the blower 105 to a value necessary for the power generation of the fuel cell 101. Then, the power generation of the fuel cell 101 starts.

Thus, the hydrogen gas discharged from the cathode 101c of the fuel cell 101 at a start or stop of the power generation of the fuel cell system 139 is sent from the second cathode combustion pipe 119 to the combustor 104 by way of the hydrogen gas back flow pipe 125, so that the hydrogen gas discharged from the cathode 101c can be perfectly combusted and discharged from the fuel cell system 139.

Further, the flow rate of air sent from the second cathode combustion pipe 119 to the combustor 104 by way of the hydrogen gas back flow pipe 125 is adjusted by the controller 121 to a value less than one fourth of the flow rate of the hydrogen gas supplied from the hydrogen gas back flow pipe 125 to the combustor 104, whereby proper operation free from the risk of a back fire that occurs from the combustor 104 toward the hydrogen gas back flow pipe 125 becomes possible.

In addition, since hydrogen gas can be kept staying in the cathode 101c of the fuel cell 101 during the power generation stop period of the fuel cell system 139, not only the flammable gas (hydrogen gas) can be sealed in the anode 101a, but also the cause of the oxidation of the catalyst in the anode 101a of the fuel cell 101 can be thoroughly eliminated so that the durability of the anode 101a of the fuel cell system 139 can be prevented.

Although air is used as the oxidizing gas in the foregoing embodiments, the oxidizing gas is not necessarily limited to air. In this case, during the period in which the hydrogen gas existing in the cathode 101c of the fuel cell 101 is replaced with the oxidizing gas or the oxidizing gas existing in the cathode 101c is replaced with the hydrogen gas (i.e., the power generation stop period or the power generation start period), the controller 121 controls the amount of gas to be supplied to the cathode 101c or the supply amount of fuel gas flowing in the hydrogen gas back flow pipe 125 such that the ratio of the flow rate of the flammable gas contained in the fuel gas to the sum of the flow rate of oxygen contained in the gas discharged from the cathode 101c and the flow rate of the flammable gas is lower than the lower combustible limit of the flammable gas or greater than its upper combustible limit based on a mixture of the flammable gas and oxygen.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The fuel cell system of the invention is useful as, for instance, a fuel cell system for household use since it has the effect of providing increased durability by preventing the oxidative degradation of the anode of the fuel cell and properly exhausting the flammable gas kept in the cathode.

The invention claimed is:

1. A method of operating a fuel cell system comprising:
supplying a power generation material gas to a reformer;
generating a fuel gas from the power generation material gas by a reforming reaction at the reformer;
generating electrical power at a fuel cell by supplying the fuel gas to an anode of the fuel cell and supplying an oxidizing gas to a cathode of the fuel cell;
stopping power generation of the fuel cell;
filling the cathode of the fuel cell with the power generation material gas and keeping the power generation material gas in the cathode after stopping the power generation;
supplying the oxidizing gas to the cathode and discharging the power generation material gas filled in the cathode from the cathode by the supplied oxidizing gas after keeping the power generation material gas in the cathode;
supplying the discharged power generation material gas to a combustor; and
combusting, at the combustor, the power generation material gas discharged from the cathode.

2. The method according to claim 1, further comprising:
supplying a combustion gas to the combustor; and
supplying a combustion air to the combustor using a combustion air feeder in such an amount that an air-fuel ratio within the combustor becomes 1 or more, with respect to flammable gas comprised of at least one of the power generation material gas supplied to the combustor and the combustion gas.

3. The method according to claim 2, wherein the gas discharged from the cathode of the fuel cell is supplied to a passage through which the combustion gas is supplied to the combustor.

4. The method according to claim 2, wherein the gas discharged from the cathode of the fuel cell is supplied to a passage through which the combustion air is supplied to the combustor.

5. The method according to claim 3, wherein, at least during the period of an operation in which the oxidizing gas in the cathode of the fuel cell is replaced with the power generation material gas or the power generation material gas in the cathode is replaced with the oxidizing gas, the amount of gas supplied to the cathode or the supply amount of the combustion gas is controlled such that the ratio of the flow rate of flammable gas contained in the combustion gas to the sum of the flow rate of oxygen contained in the gas discharged from the cathode and the flow rate of flammable gas is below the lower flammable limit of flammable gas or exceeds the upper combustible limit of flammable gas based on a mixture of flammable gas and oxygen.

6. The method according to claim 3, wherein, in cases where air is used as the oxidizing gas, at least during the period of an operation in which air in the cathode of the fuel cell is replaced with the power generation material gas or the power generation material gas in the cathode is replaced with air, the amount of gas supplied to the cathode or the supply amount of the combustion gas is controlled such that the ratio of the flow rate of flammable gas contained in the combustion gas to the sum of the flow rate of air discharged from the cathode and the flow rate of flammable gas is below the lower combustible limit of flammable gas or exceeds the upper combustible limit of flammable gas based on a mixture of the power generation material gas and air.

7. The method according to claim 5, wherein the power generation material gas is hydrogen gas.

8. The method according to claim 3, wherein, at least during the period of an operation in which the oxidizing gas in the cathode of the fuel cell is replaced with the power generation material gas or power generation material gas in the cathode is replaced with the oxidizing gas, the amount of gas supplied to the cathode or the supply amount of the combustion gas is controlled such that the ratio of the flow rate of the combustion gas to the sum of the flow rate of oxygen contained in the gas discharged from the cathode and the flow rate of the combustion gas is below the lower combustible limit of the combustion gas or exceeds the upper combustible limit of the combustion gas based on a mixture of the combustion gas and oxygen.

9. The method according to claim 3, wherein, in cases where air is used as the oxidizing gas, at least during the period of an operation in which air in the cathode of the fuel cell is replaced with the power generation material gas or the power generation material gas in the cathode is replaced with air, the amount of gas supplied to the cathode or the supply amount of the combustion gas is controlled such that the ratio of the flow rate of the combustion gas to the sum of the flow rate of air discharged from the cathode and the flow rate of the combustion gas is below the lower combustible limit of the combustion gas or exceeds the upper combustible limit of the combustion gas based on a mixture of the combustion gas and air.

10. The method according to claim 4, wherein, at least during the period of an operation in which the power generation material gas in the cathode of the fuel cell is replaced with the oxidizing gas, the amount of the oxidizing gas supplied to the cathode or the supply amount of the combustion air is controlled such that the ratio of the flow rate of the gas discharged from the cathode to the sum of the flow rate of the gas and the flow rate of the combustion air is below the lower combustible limit of the gas discharged from the cathode or exceeds the upper combustible limit of the gas based on a mixture of the gas and air.

11. The method according to claim 5, wherein at a start of the power generation, the oxidizing gas is supplied to the cathode, thereby discharging the power generation material gas.

12. The method according to claim 5, wherein the fuel cell system includes a fuel processor comprising a reformer for generating the fuel gas containing hydrogen from a power generation material, and the combustor is a fuel processing burner for heating the reformer.

13. The method according to claim 5, wherein hydrogen gas as the fuel gas is supplied to the fuel cell using a hydrogen feeder.

14. The method according to claim 12, wherein the combustion gas is the fuel gas discharged from the fuel processor or remaining fuel gas discharged from the fuel cell.

15. The method according to claim 13, wherein the combustion gas is the hydrogen gas discharged from the hydrogen feeder or remaining hydrogen gas discharged from the fuel cell.

16. The method according to claim 14, wherein during the period of the operation in which the oxidizing gas in the cathode of the fuel cell is replaced with the power generation material gas or the power generation material gas in the cathode is replaced with the oxidizing gas, the combustion air feeder supplies air in such an amount that an air-fuel ratio within the combustor as the fuel processing burner becomes 1 or more, with respect to flammable gas and the combustion gas.

17. The method according to claim 14, wherein before the operation in which the oxidizing gas in the cathode of the fuel cell is replaced with the power material generation gas or the power generation material gas in the cathode is replaced with the oxidizing gas, the temperature of the reformer is controlled so as to be lower than a specified target temperature for normal operation.

18. The method according to claim 10, wherein at a start of the power generation, the oxidizing gas is supplied to the cathode of the fuel cell, thereby discharging the power generation material gas.

19. The method according to claim 10, wherein the fuel cell system includes a fuel processor comprising a reformer for generating the fuel gas containing hydrogen from a power generation material, and the combustor is a fuel processing burner for heating the reformer.

20. The method according to claim 10, wherein hydrogen gas as the fuel gas is supplied to the fuel cell using a hydrogen feeder.

21. The method according to claim 15, wherein during the period of the operation in which the oxidizing gas in the cathode of the fuel cell is replaced with the power generation material gas or the power generation material gas in the cathode is replaced with the oxidizing gas, the combustion air feeder supplies air in such an amount that an air-fuel ratio within the combustor as a fuel processing burner becomes 1 or more, with respect to flammable gas and the combustion gas.

* * * * *